(12) United States Patent
Takahashi et al.

(10) Patent No.: US 7,923,993 B2
(45) Date of Patent: Apr. 12, 2011

(54) ROTATION DETECTION DEVICE AND ROTATION DETECTOR EQUIPPED BEARING ASSEMBLY

(75) Inventors: Toru Takahashi, Iwata (JP); Shintarou Ueno, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/461,733

(22) Filed: Aug. 21, 2009

(65) Prior Publication Data
US 2009/0315544 A1 Dec. 24, 2009

Related U.S. Application Data

(63) Continuation of application No. PCT/JP2008/000289, filed on Feb. 21, 2008.

(30) Foreign Application Priority Data

| Feb. 23, 2007 | (JP) | 2007-043735 |
| Oct. 4, 2007 | (JP) | 2007-260721 |
| Oct. 4, 2007 | (JP) | 2007-260722 |

(51) Int. Cl.
*G01B 7/30* (2006.01)

(52) U.S. Cl. ................... 324/207.25; 324/249

(58) Field of Classification Search ............. 324/207.25, 324/249; 73/514.31, 514.39
See application file for complete search history.

(56) References Cited

U.S. PATENT DOCUMENTS

| 5,930,905 A | 8/1999 | Zabler et al. |
| 6,384,752 B1 | 5/2002 | Suzuki et al. |
| 6,700,367 B1 | 3/2004 | Santos et al. |
| 7,501,812 B2 * | 3/2009 | Koike et al. ............. 324/207.25 |
| 2003/0173956 A1 * | 9/2003 | Fujikawa et al. ......... 324/207.22 |
| 2003/0192386 A1 * | 10/2003 | Tokumoto et al. ........ 73/862.334 |
| 2004/0061459 A1 | 4/2004 | Desbiolles et al. |
| 2004/0239311 A1 | 12/2004 | Santos et al. |
| 2006/0250128 A1 | 11/2006 | Tahara et al. |
| 2009/0058400 A1 * | 3/2009 | Isobe et al. ................. 324/207.2 |
| 2010/0225309 A1 | 9/2010 | Takahashi et al. |

FOREIGN PATENT DOCUMENTS

| JP | 6-58766 A | 3/1994 |
| JP | 2002-340918 | 11/2002 |
| JP | 2002-541485 | 12/2002 |
| JP | 2004-245642 | 9/2004 |
| JP | 2004-271503 | 9/2004 |
| JP | 2004/294145 A | 10/2004 |
| JP | 3792718 B | 4/2006 |
| JP | 2006-322927 | 11/2006 |

(Continued)

OTHER PUBLICATIONS

International Search Report for PCT/JP2008/000289, mailed May 27, 2008.

(Continued)

*Primary Examiner* — Bot L LeDynh

(57) ABSTRACT

A rotation detection device includes a plurality of magnetic encoders of a ring shape arranged coaxially and having different numbers of magnetic poles, a plurality of magnetic sensors each operable to detect the magnetic field of the corresponding magnetic encoder and having a function of detecting positional information within a single magnetic pole of the corresponding magnetic encoder, a phase difference detector to determine the phase difference of magnetic field signals detected respectively by the magnetic sensors, and an angle calculator to calculate an absolute rotation angle of the magnetic encoders based on the detected phase difference.

12 Claims, 21 Drawing Sheets

FOREIGN PATENT DOCUMENTS

| | | |
|---|---|---|
| JP | 2006-525518 | 11/2006 |
| WO | 96/27116 | 9/1996 |
| WO | 00/05553 A | 2/2000 |
| WO | 00/62079 | 10/2000 |
| WO | 2004/099726 A2 | 11/2004 |

OTHER PUBLICATIONS

English Translation of the International Preliminary Report on Patentability mailed Sep. 11, 2009 and issued in corresponding International Patent Application PCT/JP2008/000289.

* cited by examiner

ROTATION DETECTION DEVICE AND ROTATION DETECTOR EQUIPPED BEARING ASSEMBLY

CROSS REFERENCE TO RELATED APPLICATIONS

This application is a continuation application, under 35 U.S.C. §111(a), of international application No. PCT/JP2008/000289, filed Feb. 21, 2008, which claims priority to Japanese Patent Application No. 2007-043735, filed Feb. 23, 2007, and Japanese Patent Applications No. 2007-260721 and No. 2007-260722, both filed Oct. 4, 2007, the disclosures of which are incorporated by reference in their entirety into this application.

BACKGROUND OF THE INVENTION

1. Field of the Invention

The present invention relates to a rotation detection device that is used in various machines and equipments for detecting the angle of rotation and, in particular, for detecting the angle of rotation for the purpose of controlling the rotation of various motors, and also to a rotation detector equipped bearing assembly having such rotation detection device mounted therein.

2. Description of the Prior Art

In order to accurately detect the status of rotation of a rotary body used in, for example, an automotive vehicle or a railway vehicle, a desire has often arisen to detect a rotation signal with high resolving power and high precision. In a wheel support bearing assembly for rotatably supporting a vehicle wheel relative to a vehicle body structure, an ABS sensor is employed for the control of an anti-lock brake system, that is, for the ABS control. This ABS sensor in the state of art has a not-so-high revolving power. If with such a sensor the rotation can be detected with high resolving power, it is possible to utilize that for a high degree vehicle control such as, for example, automated drive, assisted drive, safety control and so on in the future. Also, in the control of a motor, accurate detection of the rotational position of the rotor is required for the purpose of achieving a high efficiency, noise reduction and reduction of torque ripples and such accurate rotational position can be utilized for a high level control of operation.

A rotation detection device of this kind has been suggested, which includes a first encoder, having a main track and a revolution pip track, and a second encoder used to detect the phase in a rotor of a motor and is so designed that based on a detection signal from sensors disposed in face-to-face relation with those encoders, a train of signals necessary for the motor control can be generated. (See, for example, the Patent Document 1 listed below.)

A rotation detection device utilizing a winding stator and a rotor has also been suggested, in which an absolute encoder is provided by forming a plurality of tracks having different numbers of magnetic poles in the rotor so that the absolute rotation angle can be detected based on the difference in phase between signals detected from the tracks. (See, for example, the Patent Document 2 listed below.)

A rotation detection device has further been suggested, in which a plurality of magnets arranged in a direction circumferentially of an outer periphery of a rotor and a plurality of magnetic sensors provided in an inner periphery of a stator and positioned at different locations in the direction circumferentially thereof are combined together so that the absolute angle can be detected by calculating the output signals generated from those magnetic sensors. (See, for example, the Patent Document 3 listed below.)

A still further rotation detection device has been suggested, which includes a ring-shaped magnetic pulse generating means such as, for example, a magnetic encoder having magnetic pole pairs in a direction circumferentially thereof and for generating magnetic pulses, and a plurality of detecting elements for detecting the magnetic pulses, substantially aligned in a direction circumferentially thereof and associated with the magnetic pulse generating means and is so designed that the absolute angle can be detected by calculating the respective output signals generated from the detecting elements. (See, for example, the Patent Document 4 listed below.)

[Patent Document 1] JP Laid-open Patent Publication No. 2004-271503
[Patent Document 2] JP Laid-open Patent Publication No. 2006-322927
[Patent Document 3] JP Laid-open Patent Publication No. 2006-525518
[Patent Document 4] JP Laid-open Patent Publication No. 2002-541485

However, the rotation detection devices of the structure discussed hereinabove have the following problems.

While a resolver is currently largely employed for the detection of rotational position of, for example, a motor, there is a problem that the manufacturing cost is high.

In each of the rotation detection devices of the structure discussed hereinabove, the type in which a magnetic encoder is employed has a difficulty in detecting the absolute angle and, also, securing rotation pulses with high resolving power.

In the case of the rotation detection device disclosed in the Patent Document 1, the structure is complicated and also the absolute angle cannot be detected in a non-rotating condition.

The rotation detection device disclosed in the Patent Document 2 is of a system similar to that employing the resolver and is an example in which influence brought about by misalignment relative to the rotor is reduced, but there is a problem that a complex coil is needed.

In the case of the rotation detection device disclosed in the Patent Document 3 and designed to detect the rotation of magnets with magnetic sensors, although the angle of rotation can be detected, the intensity of the magnetic field must be detected with high precision and the detection gap must be controlled accurately in order to determine the angle of rotation with high precision. Also, in order to allow this system to output rotation pulse signals, a processing circuit is needed for generating pulse signals based on the angle detected.

An object of the present invention is to provide a rotation detection device which is simple in structure and capable of accurately detecting the rotational position of a rotary body and in which the manufacturing cost can be reduced by simplifying assemblage and processing thereof and, also, a rotation detection device equipped bearing assembly having such rotation detection device mounted therein.

SUMMARY OF THE INVENTION

A rotation detection device of the present invention is a rotation detection device which includes a plurality of magnetic encoders of a ring shape arranged coaxially and having different numbers of magnetic poles, a plurality of magnetic sensors each operable to detect the magnetic field of the corresponding magnetic encoder and having a function of detecting positional information within a single magnetic pole of the corresponding magnetic encoder, a phase difference detector for determining the phase difference of magnetic field signals detected respectively by the magnetic sensors, and an angle calculator for calculating an absolute rotation angle of the magnetic encoders based on the detected phase difference.

By way of example, if rotation is made using a magnetic encoder having 12 magnetic pole pairs, and a magnetic encoder having 13 magnetic pole pairs is 13, the phase difference corresponding to one magnetic pole pair for each complete rotation occurs between the two magnetic sensors used to detect those magnetic fields. Accordingly, by detecting such phase difference with the phase difference detector and by using the angle calculator based on such phase difference, the absolute angle during one complete rotation can be calculated. Also, since each of the magnetic sensors has a function of detecting information on a position of the respective magnetic encoder within a single magnetic pole, the absolute angle can be detected with high precision. Also, the construction can be simplified.

In the present invention, each of the magnetic sensors may include a plurality of sensor elements arranged in offset relation relative to each other within a pitch between the neighboring magnetic poles so as to provide two phase signal outputs forming sine and cosine curves, respectively, and operable to detect the position within the single magnetic pole by frequency multiplication.

By designing each of the magnetic sensors as hereinabove described, a distribution of magnetic fields of the respective magnetic encoder can be finely detected as a sinusoidal signal represented by an analog voltage, not as an ON-OFF signal, and therefore the highly precise absolute angle detection can be accomplished.

In the present invention, each of the magnetic sensors may include a line sensor, in which sensor elements are lined up in a direction conforming to the direction in which the magnetic poles of the corresponding magnetic encoder are arranged and is operable to detect the position within the single magnetic pole by generating two phase signal outputs forming sine and cosine curves by unit of calculation. In such case, the position may be detected through frequency multiplication of the signal outputs.

Where each of the magnetic sensors is employed in the form of the line sensor as hereinabove described, strain of the magnetic fields pattern and influences which may be brought about by noises can be reduced and the detection error in the multiplication circuit can be reduced. Therefore, the phase of the respective magnetic encoder can be detected with further high precision.

In the present invention, the rotation detection device may further include an angle information output circuit for outputting the absolute angle calculated by the angle calculator and wherein the magnetic sensors, the phase difference detector, the angle calculator and the angle information output circuit are integrated together into a sensor module. In the case of this construction, various advantages such as reduction in number of component parts, increase in positional precision of the magnetic sensors relative to each other, reduction in manufacturing cost, reduction in assembling cost, increase in detecting precision as a result of reduction in signal noises and so on can be obtained, rendering it to be a compact rotation detection device that is low in cost.

In the present invention, the sensor module may be integrated on a semiconductor chip. Where it is integrated on a semiconductor chip, increase in reliability, compactization and increase in solidity can be accomplished and, also, the cost can be reduced during mass-production.

In the present invention, the angle calculator may include a corrector for correcting the calculated absolute angle with an output from one of the magnetic sensors, which is adjacent either one of the magnetic encoders.

When, as hereinabove described the angle calculator for calculation of absolute angle based on the phase difference detected by the phase difference detector and the absolute angle is corrected by the corrector with the use of the output from one of the magnetic sensors adjacent either one of the magnetic encoders, the absolute angle can be detected with even higher precision without being adversely affected by magnetic interference between the magnetic encoders and noises.

In the present invention, the rotation detection device may further include an angle information output circuit for outputting the absolute angle, calculated by the angle calculator, in the form of an ABZ phase signal comprised of two, A phase and B phase pulse signals which are displaced 90° in phase relative to each other and a Z phase pulse signal indicative of a position of origin. In the case of this construction, no extra interface for outputting the absolute angle need be employed and, therefore, the circuit construction of this rotation detection device and the circuit construction on the side of a machine in which the rotation detection device is mounted can be simplified.

In the present invention, the angle calculator may include a corrector for correcting the calculated absolute angle with an output from one of the magnetic sensors, which is adjacent either one of the magnetic encoders, and the angle information output circuit is operable to output an ABZ phase signal with reference to the output of one of the magnetic sensors, which has been selected for use in correction of the absolute angle. By so doing, it is possible to detect the absolute angle with further high precision.

In such case, the magnetic sensor selected for use in correction of the absolute angle preferably corresponds to one of the magnetic encoders having the different numbers of magnetic poles, which has the number of the magnetic poles greater than the others of the magnetic encoders.

In the case of this construction, the ABZ phase signal with higher resolving power can be obtained.

A rotation detection device equipped wheel support bearing assembly of the present invention comprises a rotation detection device of any one of the foregoing constructions according to the present invention, mounted on a bearing thereof.

According to the above described construction, since the rotation detection device of the above described construction is mounted on the bearing, the number of component parts and assembling steps used in the machine that includes the bearing assembly, and compactization can be accomplished while securing a functionality of detecting the absolute angle. By way of example, when this bearing assembly is applied to an automotive vehicle as a wheel support bearing assembly, a minute difference in rotation between left and right wheels and change in rotational speed can be detected with high sensitivity and, therefore, a highly sophisticated vehicle control is possible with the utilization of this signal and the safety and maneuverability of the automotive vehicle can be increased. For example, the precision with which the rotational speed of each of the left and right vehicle wheels can be increased and predication of the amount of skid of a tire during cornering can be facilitated, leading to increase in precision of a skid preventive apparatus and a vehicle attitude stabilizing device. Also, a slight advance and/or backward movement at the time of starting on a slope can be detected together with the direction of rotation of each vehicle wheel and, by performing an optimum brake control appropriate to a condition, the easiness of drive of the automotive vehicle can be increased. Accordingly, there is no need to employ the magnetic sensors in proximity of the magnetic encoders in order to increase the detecting precision and, therefore, assemblage and processing of the rotation detection device can be simplified to thereby reduce the manufacturing cost.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
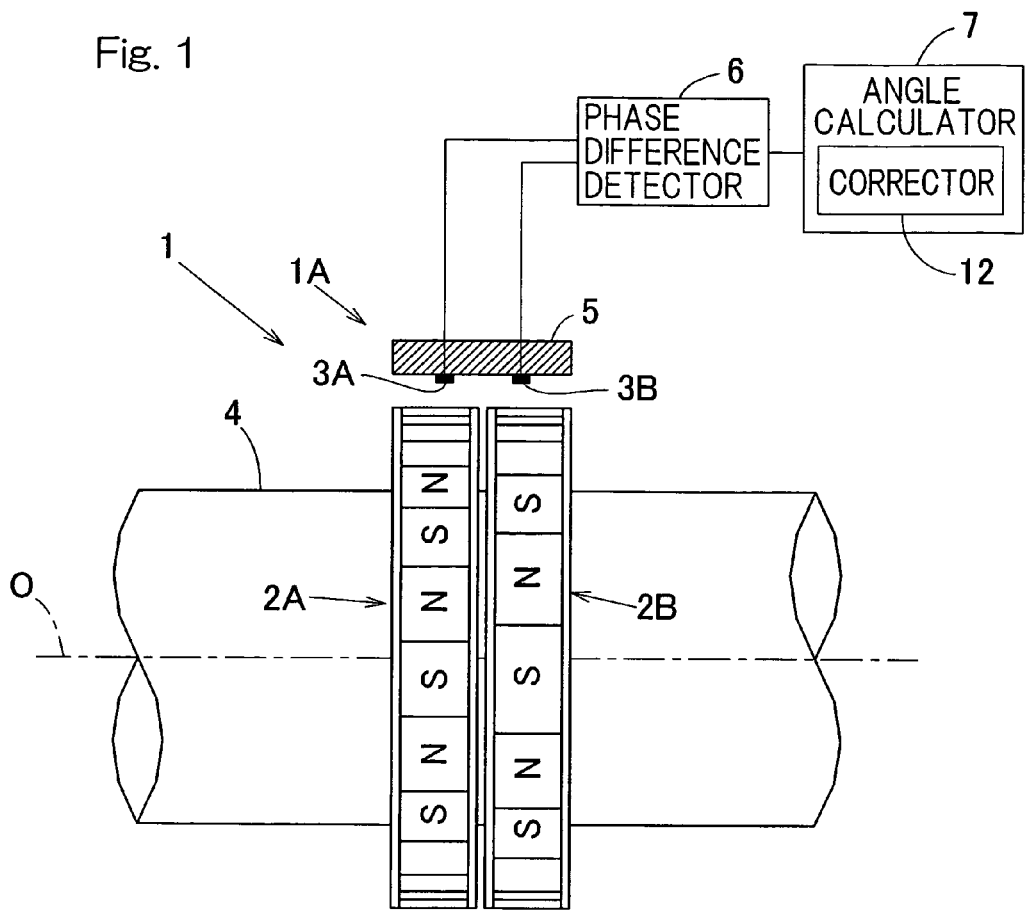
FIG. 1 is a schematic diagram showing a rotation detection device according to a first preferred embodiment of the present invention.

A first preferred embodiment of the present invention will be described in detail with particular reference to FIGS. 1 to 8. FIG. 1 illustrates a schematic structure of a rotation detection device according to this embodiment. This rotation detection device 1 includes a plurality of (for example, two, in the illustrated embodiment) magnetic encoders 2A and 2B mounted on an outer periphery of a rotating member 4 such as, for example, a rotary shaft of a motor or a rotatable ring of a wheel support bearing assembly, each in a ring shape in coaxial relation with the longitudinal axis O of the rotating member 4, and a plurality of (for example, two, in the illustrated embodiment) magnetic sensors 3A and 3B for detecting respective magnetic fields emanating from the associated magnetic encoders 2A and 2B. The magnetic sensors 3A and 3B are, in the illustrated embodiment, provided at a stationary member 5 such as, for example, a housing of the motor or a stationary ring of the bearing assembly so as to be held in face-to-face relation with the associated magnetic encoders 2A and 2B in a direction radially of the latter with minute gaps intervening between the magnetic encoders 2A and 2B and the magnetic sensors 3A and 3B. In the instance now under discussion, the magnetic sensor 3A confronts the magnetic encoder 2A whereas the magnetic sensor 3B confronts the magnetic encoder 2B.

Each of the magnetic encoders 2A and 2B is in the form of a ring made of a magnetic material and having a plurality of magnetic pole pairs, one pair consisting of a south pole S and a north pole N, that are magnetized thereto at equal intervals in a direction circumferentially thereof and, in the example of FIG. 1 showing a radial type, the magnetic pole pairs are magnetized on an outer peripheral surface of the respective magnetic encoder 2A and 2B. The number of the magnetic pole pairs in one of the magnetic encoders 2A and 2B is different from that in the other of the magnetic encoders 2A and 2B. Also, although in the example shown in FIG. 1, the two magnetic encoders 2A and 2B are closely juxtaposed relative to each other in the axial direction of the rotatable member 4, they may be positioned at separate locations away from each other, provided that those magnetic encoders 2A and 2B can rotate in unison with each other.

Figure 2:
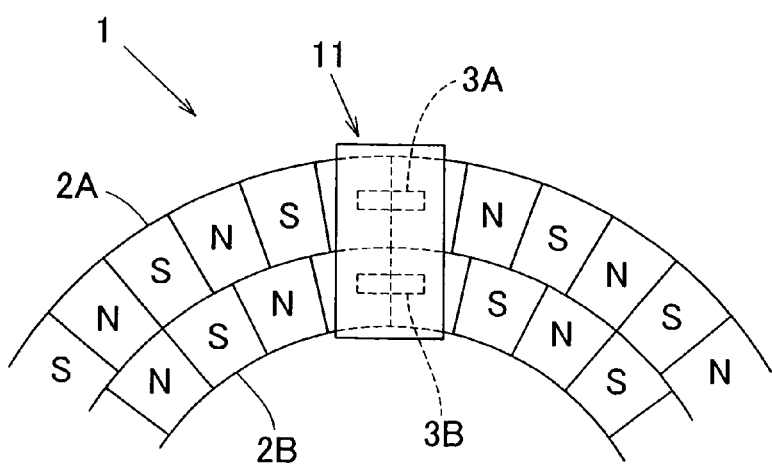
FIG. 2 is a fragmentary side view showing another example of construction of the rotation detection device.

As another example of the magnetic encoders 2A and 2B, an axial type may be employed, in which as best shown in FIG. 2, a plurality of magnetic pole pairs are arranged on respective axial end faces of rings, each made of a magnetic material, at equal intervals in the direction circumferentially thereof. In this example, the two magnetic encoders 2A and 2B are so positioned one inside the other with inner and outer peripheral faces of those magnetic encoders 2A and 2B confronting or held in contact with each other. In the case of the magnetic encoders 2A and 2B of the axial type, the magnetic sensors 3A and 3B are so positioned as to axially confront respective magnetized surfaces of the magnetic encoders 2A and 2B.

Figure 3:
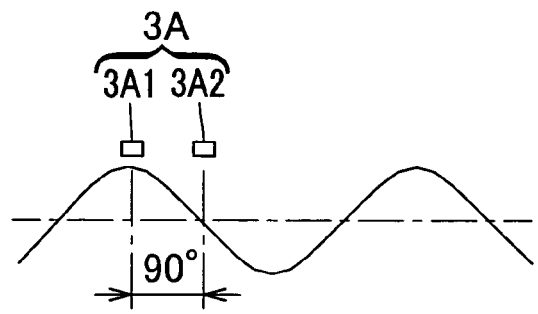
FIG. 3 is an explanatory diagram showing an example of construction of a magnetic sensor.

Each of the magnetic sensors 3A and 3B is designed to have a function of detecting the magnetic poles with a finer resolution than the number of the magnetic pole pairs of the respective magnetic encoder 2A and 2B, that is, a function of acquiring information on a position or rotational information within a single magnetic pole of each of the magnetic encoder 2A and 2B. In order to implement this function, using the magnetic sensor 3A, for example, two magnetic sensor elements 3A1 and 3A2 such as, for example, when the pitch λ of one of the magnetic pole pairs of the associated magnetic encoder 2A is assumed to be equal to one period or one cycle, two Hall elements are so arranged and so spaced in a direction of arrangement of magnetic poles as to be spaced 90° in phase from each other as shown in FIG. 3. The phase within a single magnetic pole (($\phi=\tan^{-1}(\sin \phi/\cos \phi)$) may be calculated by frequency multiplying two phase signals ($\sin \phi$ and $\cos \phi$) obtained from those two magnetic sensor elements 3A1 and 3A2 with respective multiplying circuits built in those magnetic sensor elements 3A1 and 3A2. This equally applies to the other magnetic sensor 3B. It is to be noted that the waveform shown in FIG. 3 represents the arrangement of the magnetic poles of the magnetic encoder 2A in terms of the magnetic field strengths emanating therefrom.

When the magnetic sensors 3A and 3B are so constructed as hereinabove described, respective distributions of magnetic fields emanating from the magnetic encoders 2A and 2B can be finely detected as a sinusoidal signal with an analog voltage, not as an On/Off signal, thereby making it possible to achieve an accurate detection of the absolute angle.

Figure 4A:
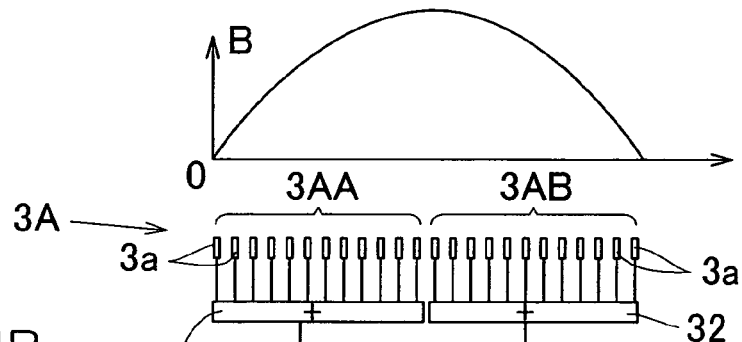
FIGS. 4A to 4C are diagrams showing a different example of construction of a magnetic sensor.
Figure 4B:
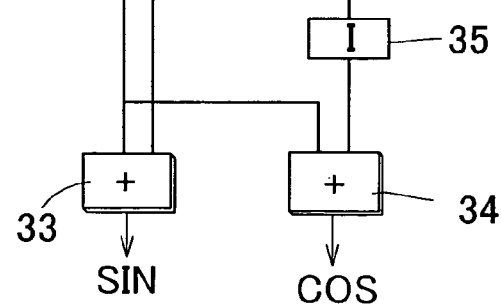
Figure 4C:
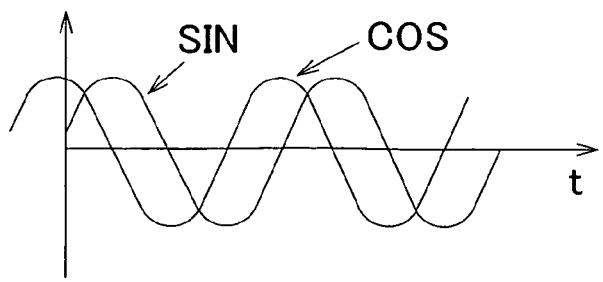

As another example of each of the magnetic sensors 3A and 3B having a function of acquiring information on a position within one of the magnetic poles of the corresponding magnetic encoder 2A and 2B, such a line sensor as shown in FIG. 4B may be employed. In other words, for the magnetic sensor 3A, for example, line sensors 3AA and 3AB may be employed, in which magnetic sensor elements 3a are lined up in a direction of arrangement of the magnetic poles of the corresponding magnetic encoder 2A. It is to be noted that FIG. 4A illustrates a waveform of the interval of one magnetic pole in the magnetic encoder 2A as converted into the magnetic field strength. In such case, the first line sensor 3AA of the magnetic sensor 3A is disposed in a 90° phase sub-sector of the 180° phase sector whereas the second line sensor 3AB is disposed in the remaining 90° phase sub-sector. With the above described arrangement, by further summing a signal S1, which is a summation of detection signals of the first line sensor 3AA performed by an adder circuit 31, and a signal S2, which is a summation of detection signals of the second line sensor 3BB performed by another adder circuit 32, together by still another adder circuit 33, a sine signal based on the magnetic field signal, as shown in FIG. 4C, can be obtained. Also, by summing the signal S1 and the signal S2 that is fed through an inverter 35, together by a further adder circuit 34, a cosine signal based on the magnetic field signal, as shown in FIG. 4C, can be obtained. From those two phase output signals obtained in this way, a position within one of the magnetic poles can be detected.

Where each of the magnetic sensors 3A and 3B is so constructed as hereinabove described, influences such as, for example, noises and/or strains of the magnetic field pattern can be reduced and the phase of the respective magnetic encoder 2A and 2B can be detected with high precision.

For example, in the example of construction shown in FIG. 1, the magnetic sensors 3A and 3B are connected to a phase difference detector 6. The phase difference detector 6 determines the difference in phase between the magnetic field signals detected respectively by the magnetic sensors 3A and 3B, and an angle calculator 7 is connected downstream of the phase difference detector 6. The angle calculator 7 calculates the absolute angle of the magnetic encoders 2A and 2B based on the phase difference detected by the phase difference detector 6. Also, this angle calculator 7 includes a corrector 12 for correcting the calculated absolute angle with an output of the magnetic sensor 3A associated with either one of the magnetic encoders (for example, the magnetic encoder 2A).

An operation of the rotation detection device 1 of the structure described above to detect the absolute angle will now be described in outline with particular reference to FIGS. 5 and 6. Assuming that in FIG. 1 the respective numbers of the pair of the magnetic poles that the two magnetic encoders 2B and 2A have are expressed by P and P+n, the phase difference between the magnetic encoders 2A and 2B per rotation will be n number of the phase for a single magnetic pole pair and, therefore, phases of the respective detection signals of the magnetic sensors 3A and 3B associated with the magnetic encoders 2A and 2B match with each other for each 360/n degree rotation.

Figure 5:
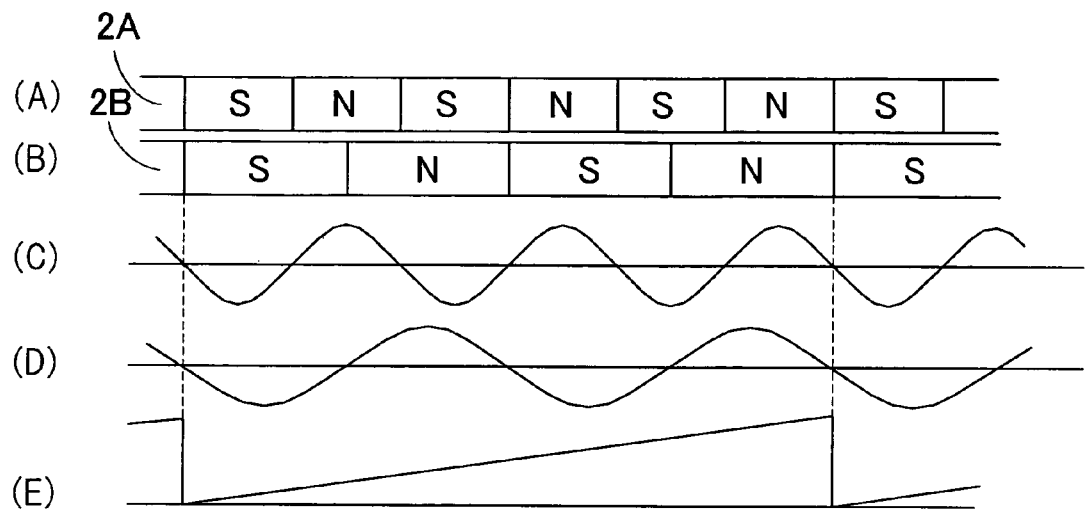
FIG. 5 is a chart showing waveforms of detection signals outputted from the magnetic sensors and those of detection signals outputted from a phase difference detector.

Examples of the respective patterns of the magnetic poles of the magnetic encoders 2A and 2B are shown in (A) and (B) of FIG. 5, respectively, and waveforms of the respective detection signals of the magnetic sensors 3A and 3B corresponding to those magnetic encoders are shown in (C) and (D) of FIG. 5. In this case, two magnetic pole pairs of the magnetic encoder 2B correspond to three magnetic pairs of the magnetic encoder 2A and the absolute position within the range covered by these magnetic poles can be detected. FIG. 5(E) illustrates a waveform of an output signal indicative of the phase difference determined by the phase difference detector 6, shown in FIG. 1, on the basis of the detection signals shown respectively in FIG. 5, (C) and (D).

Figure 6:
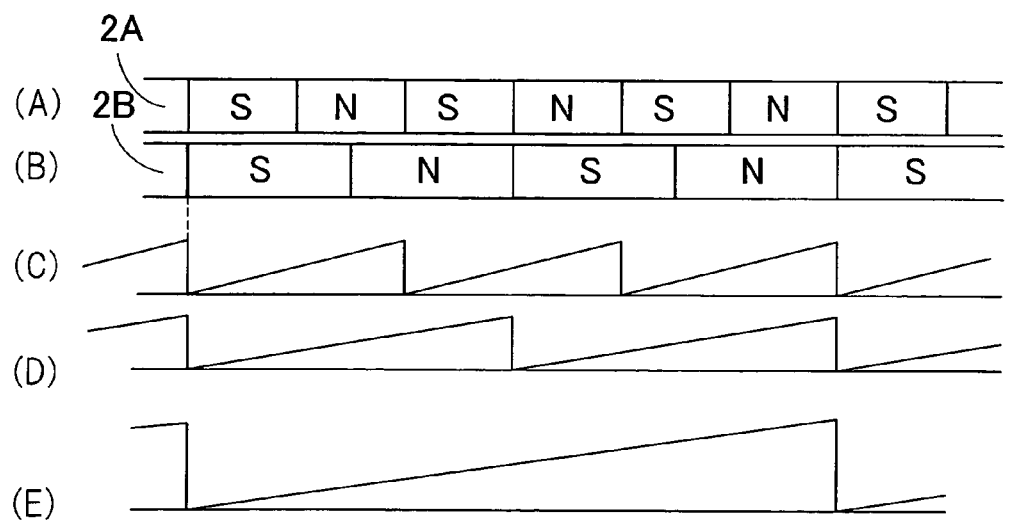
FIG. 6 is a chart showing the respective phases of the detection signals from the magnetic sensors and the difference in phase between those detection signals.

It is to be noted that FIG. 6 illustrates waveforms of the detected phases by the magnetic sensors 3A and 3B and the phase difference. In other words, respective examples of the magnetic poles of the magnetic encoders 2A and 2B are shown in (A) and (B) of FIG. 6, and respective waveforms of the detected phases of the corresponding magnetic sensors 3A and 3B are shown in (C) and (D) of FIG. 6, and the waveform of the phase difference signal outputted from the phase difference detector 6 is shown in (E) of FIG. 6.

Figure 7:
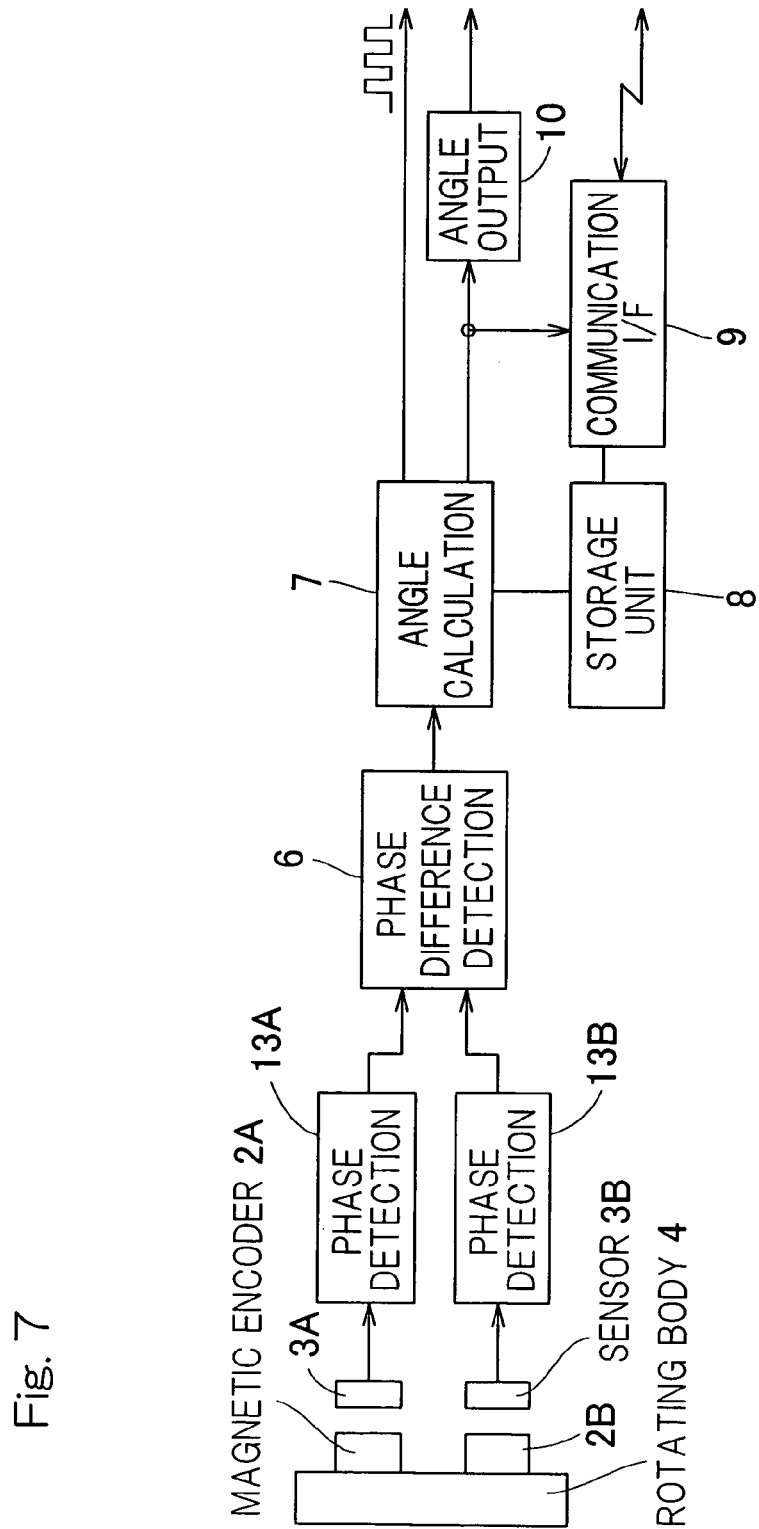
FIG. 7 is a circuit block diagram showing one example of construction of an absolute angle detecting circuit used in this rotation detection device.

FIG. 7 illustrates an example of construction of an absolute angle detecting circuit employed in this rotation detection device 1. Based on the respective detection signals of the magnetic sensors 3A and 3B shown respectively in (C) and (D) of FIG. 5, phase detecting circuits 13A and 13B associated respectively with the magnetic sensors 3A and 3B output such detected phase signals as shown respectively in (C) and (D) of FIG. 6. The phase difference detector 6 is operable based on those detected phase signals to output a phase difference signal of such a waveform as shown in (E) of FIG. 6.

The angle calculator 7 provided downstream thereof performs a process of converting the phase difference, so determined by the phase difference detector 6, into an absolute angle according to one or more predetermined calculation parameters. The calculation parameter used by the angle calculator 7 is stored in a storage unit 8 such as, for example, a nonvolatile storage unit. This storage unit 8 stores, in addition to the calculation parameter referred to above, various pieces of information required to operate the device, such as, for example, setting the numbers of the magnetic pole pairs of those magnetic encoders 2A and 2B, the absolute angle reference position and signal outputting methods. In the illustrated instance, a communication interface 9 is provided in the stage subsequent to the storage unit 8 so that the contents stored in the storage unit 8 can be updated through the communication interface 9. Accordingly, the individual setting information can be modified according to the current condition of use, thus increasing the handleability.

The absolute angle information calculated by the angle calculator 7 is outputted as a modulated signal such as, for example, PWM, an analog voltage, serial data or a parallel signal from an angle information output circuit 10 or through the communication interface 9. Also, a rotation pulse signal is also outputted from the angle information output circuit 10. For the rotation pulse signal, it is sufficient to output one of the detection signals generated respectively from the two magnetic sensors 3A and 3B. As hereinabove described, since each of the magnetic sensors 3A and 3B is equipped with a respective multiplying function, the rotation signal can be outputted with a high resolution.

The angle information output circuit 10 shown in FIG. 7 may be so designed as to output the absolute angle, calculated by the angle calculator 7, as an ABZ phase signal comprised of two pulse signals, including A and B phase signals differing 90° in phase from each other, and a pulse signal including a Z phase signal indicative of the position of origin. In such case, by electrically processing or setting the respective magnetic pole numbers of the magnetic encoders 2A and 2B so set that the difference in phase between the respective output signals of the magnetic sensors 3A and 3B matches once per rotation, one Z phase pulse signal is generated per each complete rotation of the rotatable member 4.

Figure 8:
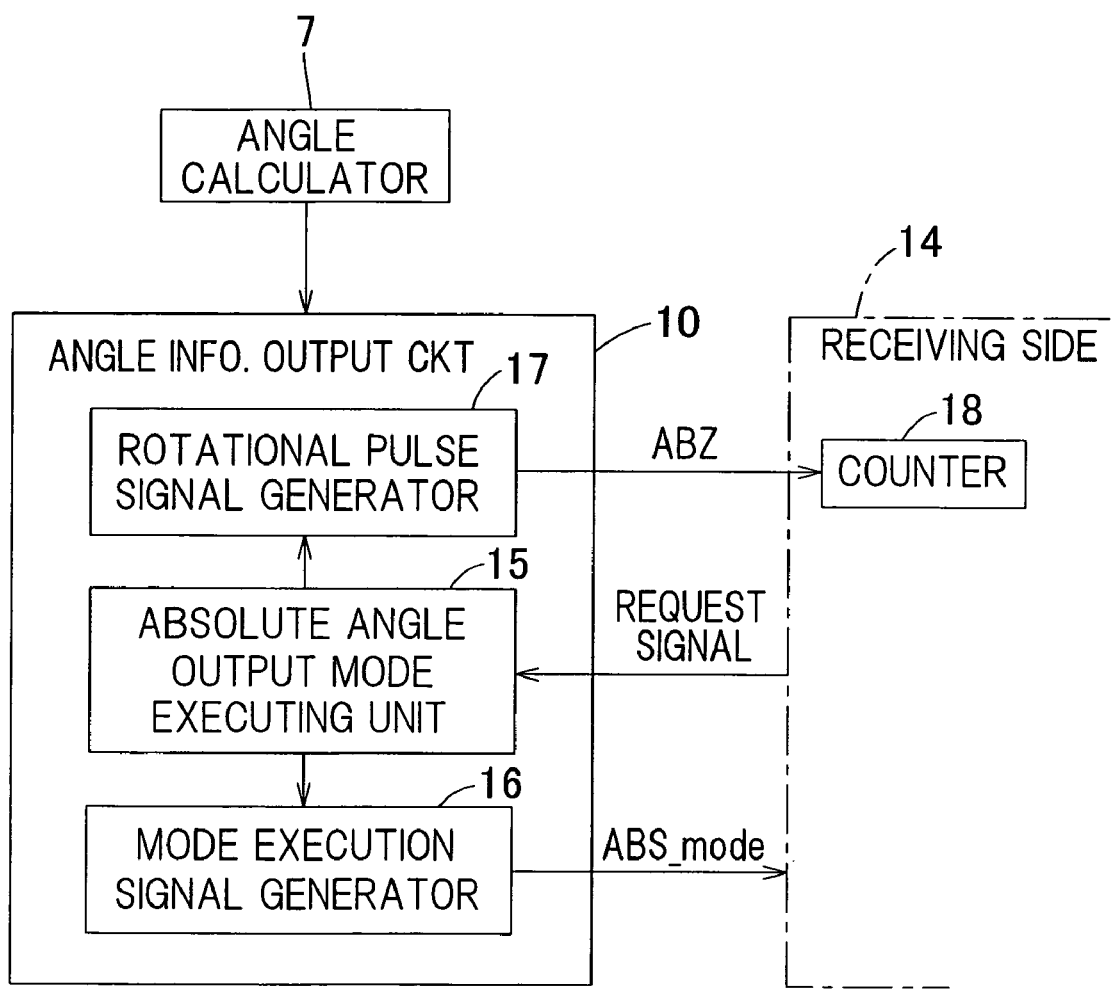
FIG. 8 is a circuit block diagram showing one example of construction of an angle information output circuit used in this rotation detection device.

To output the ABZ phase signal, the angle information output circuit 10 may be so designed that, when as shown in FIG. 8, a request signal requesting the absolute angle to be outputted is supplied from a receiving side circuit 14 to the angle information output circuit 10, an absolute angle executing unit 15, included in the angle information output circuit 10, can be enabled in response to the request signal and a mode execution signal (ABS_mode=1) indicative of the absolute angle output mode taking place can be then generated from a mode execution signal generator 16 also included in the angle information output circuit 10, and A, B and Z phase signals can therefore be generated from a rotation pulse signal generator 17 also included in the angle information output circuit 10.

In the receiving side circuit 14, a position counter 18 indicative of the absolute angle value is reset to zero (0) in response to receipt of the Z phase signal and counts the A phase signal and the B phase signal that are outputted following the Z phase signal. Once pulse outputs of the A phase signal and of the B phase signal reach the current absolute angle value, the operation under the absolute angle output mode then terminates (ABS_mode=0). Thereafter, a rotation pulse signal (the ABZ phase signal) representing change in absolute angle detected as a result of rotation of the rotatable member 4 (FIG. 1) is outputted from the angle calculator 7. In this way, in the receiving side circuit 14, in which the absolute angle is ascertained by counting the pulses, a condition is established in which subsequent to termination (ABS_mode=0) of the operation under the absolute angle output mode, the actual absolute angle information is acquired at all times.

As hereinabove described, when arrangement is made so that the rotation pulse signal such as the ABZ phase signal can be outputted from the angle information output circuit 10 and the absolute angle information can be outputted during the absolute angle output mode, the circuit design of the rotation detection device 1 and the circuit design of a machine or equipment having the rotation detection device 1 incorporated therein can be simplified with no need to implement any extra interface for outputting the absolute angle.

Also, in this rotation detection device 1, the magnetic sensors 3A and 3B and a signal processing circuit including the angle information output circuit 10 shown in FIG. 7 may be integrated in a sensor module 11 such as shown in the example of FIG. 2. This sensor module 11 may be integrated on a single semiconductor chip. Where they are so designed as described above, such advantages as, for example, reduction in the number of component parts used, increase of the positional accuracy of the magnetic sensors 3A and 3B relative to each other, reduction of the manufacturing cost, reduction of the assembling cost and increase of the detecting accuracy resulting from reduction of the signal noises can be obtained and the rotation detection device 1 can be designed to be compact in size and low in cost.

It is to be noted that in such case, since the single sensor module 11 is so arranged as to confront the two magnetic encoders 2A and 2B, those two magnetic encoders 2A and 2B are naturally arranged in close proximity to each other.

As hereinabove described, since the rotation detection device 1 includes the plurality of the magnetic encoders 2A and 2B provided in the form of rings coaxial to one another and having the respective numbers of the magnetic poles different from each other, the plural magnetic sensors 3A and 3B for detecting the magnetic fields emanating respectively from the magnetic encoders 2A and 2B and each having the function of detecting information on a position within one of the magnetic poles of the associated magnetic encoder 2A and 2B, in which the phase difference between the magnetic field signals detected by the respective magnetic sensors 3A and 3B is determined by the phase difference detector 6 and, based on the detected phase difference, the absolute angle of the magnetic encoders 2A and 2B is calculated by the angle calculator 7, the structure can be simplified and the absolute angle can be detected with high accuracy. Accordingly, the accurate rotational position of the rotatable body can be detected.

Although in the embodiment hereinabove described, reference has been made to the use of the two magnetic encoders 2A and 2B, the number of the magnetic encoders used may not be limited to two such as shown and described and three or more magnetic encoders having the respective number of the magnetic pairs different from each other may be combined so that the absolute angle can be detected in a wide range. Where this rotation detection device 1 is used for the detection of the rotation of the motor, by employing, in adjusting the difference in number of the magnetic pairs referred to above, such a combination as P and P+Pn in consideration of the number Pn of rotor poles of the motor, the electrical angle of the motor can be detected by the rotation detection device 1 and, therefore, it is convenient to the control of rotation of the motor.

Figure 10:
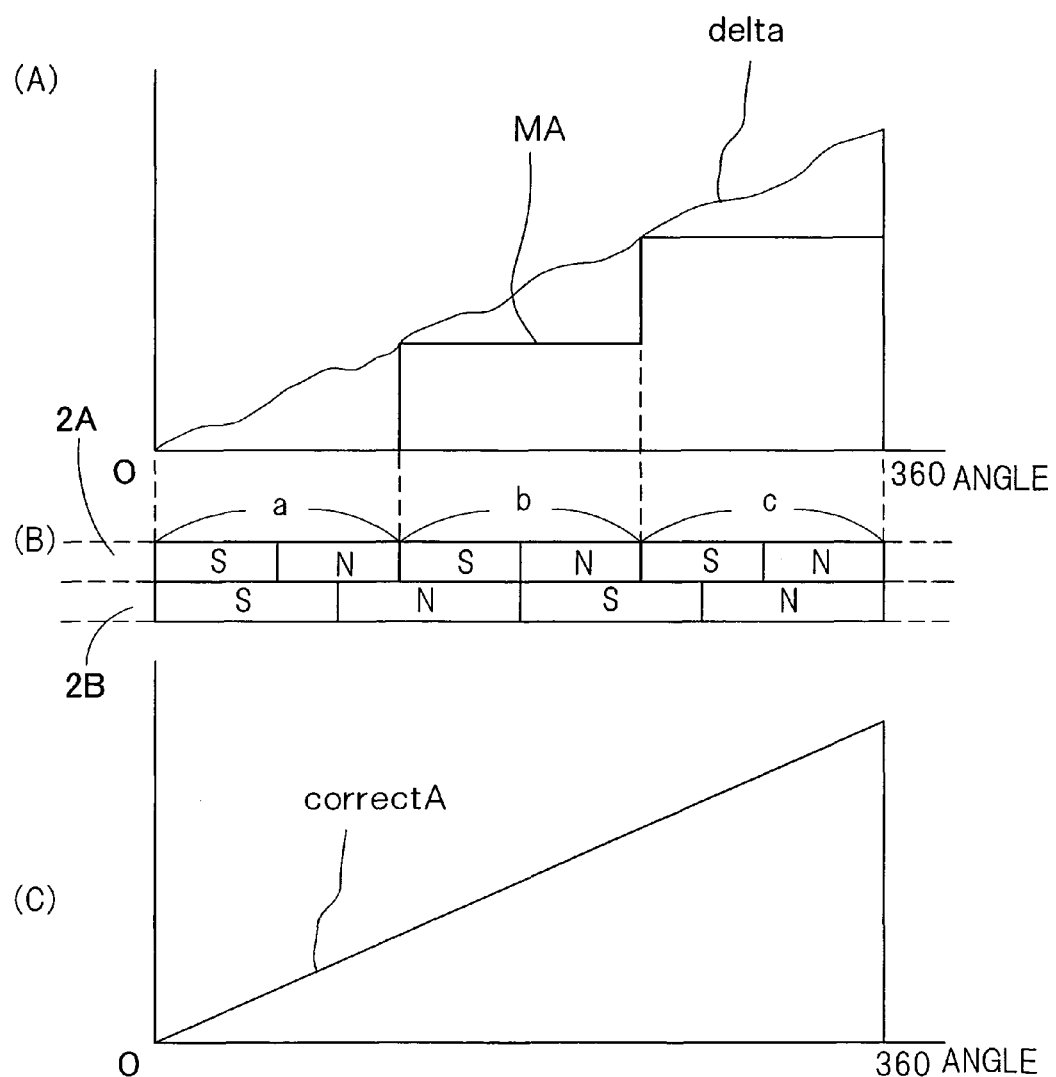
FIG. 10 is an explanatory diagram showing a process of correction of the phase difference signal detected by the phase difference detector, which process is performed by a corrector at the angle calculator.
Figure 11:
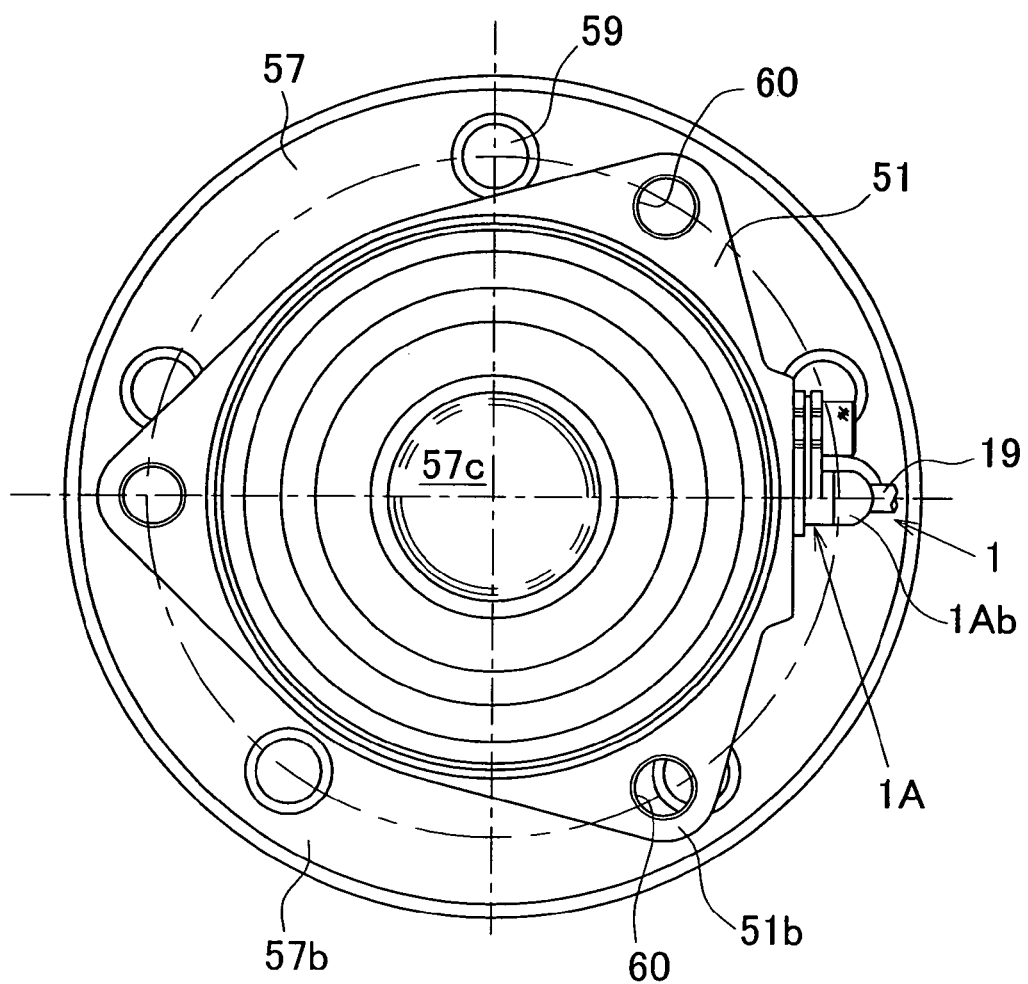
FIG. 11 is a side view showing the wheel support bearing assembly as viewed from an inboard side.

Hereinafter, the wheel support bearing assembly having mounted therein the rotation detection device 1 according to the foregoing first embodiment of the present invention will be described in detail with particular reference to FIGS. 9 to 11. A wheel support bearing assembly according to this first embodiment is of a type that is fitted to an automotive vehicle such as, for example, a motor car. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 9:
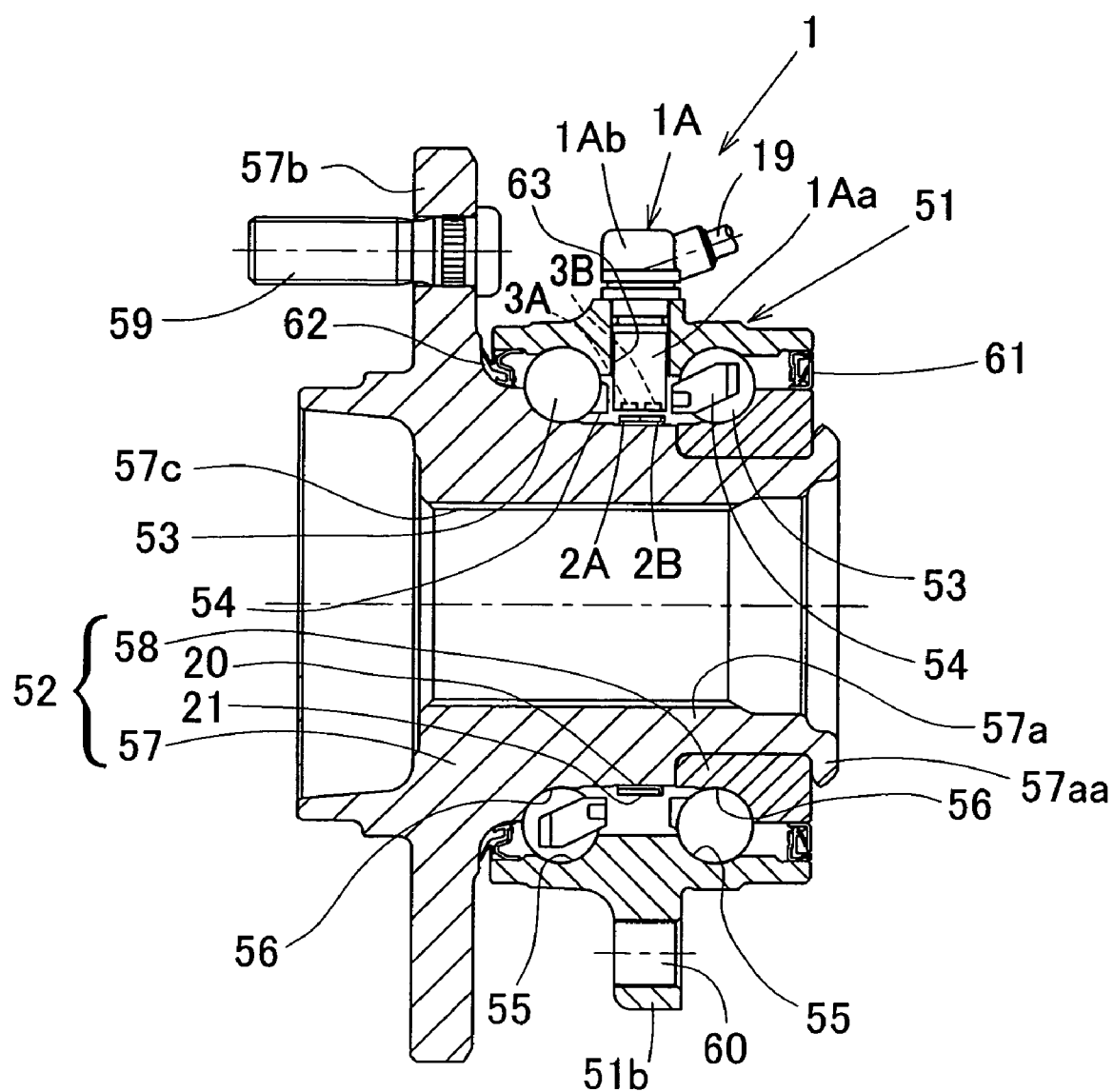
FIG. 9 is a sectional view showing a rotation detection device equipped wheel support bearing assembly according to a first preferred embodiment of the present invention.

This wheel support bearing assembly is of a type including a plurality of rows of rolling elements 53 interposed between an outer member 51 and an inner member 52 as shown in FIG. 9 and is used for rotatably supporting a vehicle wheel relative to a vehicle body structure, with the previously described rotation detection device 1 mounted therein. The previously described rotation detection device 1 has an appearance representing such a shape that is suitable for the respective mounting condition in each different example as hereinafter described.

The outer member 51 is a stationary member and the inner member 52 is a rotating member. The rows of the rolling elements 53 are retained by a retainer 54 employed for each row and are interposed between a plurality of rolling surfaces 55, formed in an inner periphery of the outer member 51, and a plurality of rolling surfaces 56 formed in an outer periphery of the inner member 52. Those wheel support bearing assemblies are rendered to be dual row angular contact ball bearing types, in which the raceway surfaces 55 and 55, 56 and 56 referred to above are so formed as to represent respective contact angles that are held in back-to-back relation with each other.

The first embodiment shown in FIG. 9 is a so-called third generation type and is used for supporting a vehicle drive wheel. The inner member 52 is made up of two components, that is, a hub unit 57 and an inner ring 58 mounted on an outer periphery of an inboard end of a hub axle 57a of the hub unit 57, with the rolling surfaces 56 formed respectively in the outer periphery of the hub axle 57a of the hub unit 57 and that of the inner ring 58. The hub axle 57a of the hub unit 57a has a center bore 57c defined therein for passage therethrough of a stem portion of a constant velocity universal joint. The inner ring 58 is mounted on a radially inwardly stepped area formed in the hub axle 57a of the hub unit 57 and is fixed to the hub unit 57 by means of a crimped portion 57aa provided at an inboard end of the hub axle 57a. The hub unit 57 has an outer periphery formed with a wheel mounting flange 57b positioned in the vicinity of an outboard end thereof, and the vehicle wheel and a brake rotor (both not shown) are fitted in overlapped relation to the wheel mounting flange 57b by means of hub bolts 59. The hub bolts 59 are press fitted into corresponding bolt insertion holes defined in the wheel mounting flange 57b. The outer member 51 is of one piece construction having a vehicle body fitting flange 51b formed on an outer periphery thereof. This outer member 51 is fitted to a knuckle (not shown) of a vehicle suspension system by means of knuckle bolts inserted into corresponding bolt holes 60 defined in the vehicle body fitting flange 51b.

The outer member 51 and the inner member 52 cooperate with each other to define a bearing space therebetween, which have its opposite ends sealed by respective contact sealing members 61 and 62 such as, for example, contact seals.

A sensor side unit 1A of the rotation detection device 1 is fitted to the outer member 51 by inserting it into a sensor mounting hole 63 defined in the outer member 51 so as to extend radially thereof at a location intermediate between the rolling element rows 53 and 53, and the magnetic sensors 3A and 3B, disposed at a foremost end of the sensor side unit 1A are so disposed as to confront the respective magnetic encoders 2A and 2B mounted on the outer diametric surface of the hub unit 57, with a radial gap intervening between them and the magnetic encoders 2A and 2B. The sensor mounting hole 63 is a throughhole of, for example, a round sectional shape. Between an inner surface of the sensor mounting hole 63 and the sensor side unit 1A is fitted a contact sealing element such as, for example, an O-ring or is filled with a deposit of bonding material. The outer member 51 and the rolling element rows 53 correspond respectively to the stationary member 5 and the rotating member 4 both described in detail hereinbefore. The sensor side unit 1A is provided at one location in a circumferential direction of the bearing assembly as shown in FIG. 11.

The sensor side unit 1A of the rotation detection device 1 includes a shaft-like insertion portion 1Aa of an inner diameter substantially equal to the diameter of the sensor mounting hole 63 and a head portion 1Ab which is a non-insertion portion, and the head portion 1Ab is positioned on an outer peripheral surface of the outer member 51 in contact therewith. A cable 19 is drawn out of the head portion 1Ab. The insertion portion 1Aa and the head portion 1Ab, both referred to above, are made of, for example, a moldable resin or an elastic member.

The phase difference signal (FIG. 6E) detected by the phase difference detector 6 is affected by influences brought about by noises and magnetic interference between the magnetic encoders 3A and 3B and, therefore, in reality, it represents such a distorted waveform as indicated by delta in FIG. 10A. In other words, when, for example, detection errors of $\epsilon 1$ and $\epsilon 2$ are contained in the respective detection signals of the magnetic sensors 3A and 3B, the phase difference signal delta contains a detection error of about $\epsilon 1 + \epsilon 2$.

In view of the above, in the angle calculator 7 shown in FIG. 7, the following process is performed to calculate the absolute angle having a high detection accuracy. It is to be noted that FIG. 10 illustrates the example, in which the numbers of the magnetic pole pairs of the two magnetic encoders 2B and 2A are 2 and 3, respectively; there is a phase difference between the magnetic encoders 2A and 2B, which corresponds to one magnetic pole pair per rotation; and the respective phases of the detection signals of those magnetic sensors 3A and 3B associated with the magnetic encoders 2A and 2B match with each other per 360° rotation.

The angle calculator 7 estimates, as a first process, a rough phase of one of the magnetic encoders (which, in this instance, is the magnetic encoder 2A having the magnetic pole pairs in a number greater than that of the other of the magnetic encoders) as representing such a waveform as indicted by MA in FIG. 10(A), based on the waveform of the phase difference signals delta of FIG. 10(A) detected by the phase difference detector 6 and detection positions a, b and c of the magnetic pole pairs of the magnetic encoder 2A shown in FIG. 10(B).

In a second process, by the operation of the corrector 12 of the angle calculator 7, the phase difference signal delta shown in FIG. 10A is corrected as follows. By adding a phase signal $\theta 1/3$ of the magnetic encoder 2A to the estimated rough phase MA, a phase difference signal, correctA=MA+($\theta 1/3$), which has been corrected as shown in FIG. 10C, can be obtained.

In a third process, based on the phase difference signal correctA so corrected, the absolute angle is calculated.

In this case, although even the phase difference signal correctA corrected in the manner described above contain a detection error, the detection error will be $\epsilon 1/3$ since division is performed by magnetic pole number 3 of the magnetic encoder 2A. It will readily be seen that his detection error is clearly small when compared with the detection error $\epsilon 1+\epsilon 2$ of the phase difference signal delta before correction. Accordingly, the absolute angle can be detected with the same accuracy as the detection accuracy of the magnetic sensors 3A and 3B.

Where the absolute angle is to be calculated from the phase difference signal delta before correction shown in FIG. 10(A), the absolute angle signal obtained will not be synchronous with the ABZ phase signal obtained from each of the magnetic encoders 2A and 2B. Accordingly, in this embodiment, the ABZ phase signal is outputted from the detection signal of the magnetic sensor 3A on the side of the magnetic encoder 2A that is utilized in correction of the phase difference signal delta. In this way, the phase difference signal correctA corrected and the ABZ phase signal will be synchronized with each other.

Also, in this embodiment, since correction is made to the phase difference signal delta with the sensor output of the magnetic sensor 3A on the side of the magnetic encoder 2A having a greater number of the magnetic poles, the ABZ phase signal can be obtained with a higher resolution.

Moreover, in this rotation detection device 1, the magnetic sensors 3A and 3B and the signal processing circuit including the angle information output circuit 10 shown in FIG. 8 may be integrated into a single sensor module 11 as shown in, for example, the example of FIG. 2. This sensor module 11 may be integrated on a single semiconductor chip. When so designed, various advantages such as reduction in number of component parts, increase in positional precision of the magnetic sensors 3A, 3B relative to each other, reduction in manufacturing cost, reduction in assembling cost, increase in detecting precision as a result of reduction in signal noises and so on can be obtained, thereby making it possible to design a rotation detection device compact and low in cost.

It is, however, to be noted that in this case, since the single sensor module 11 is so arranged as to confront the two magnetic encoders 2A and 2B, those two magnetic encoders 2A and 2B are naturally arranged in close proximity to each other.

As hereinabove described, the rotation detection device 1 employed in the rotation detector equipped wheel support bearing assembly is so designed as to include the plurality of the magnetic encoders 2A and 2B provided in the form of rings coaxial to one another and having the respective numbers of the magnetic poles different from each other, the plural magnetic sensors 3A and 3B for detecting the magnetic fields emanating respectively from the magnetic encoders 2A and 2B and each having the function of detecting information on a position within one of the magnetic poles of the associated magnetic encoder 2A and 2B. The difference in phase between the magnetic field signals detected respectively by the magnetic sensors 3A and 3B is determined by the phase difference detector 6 and, based on the detected phase difference, the absolute angle of the magnetic encoders 2A and 2B is calculated by the angle calculator 7. For this reason, the absolute angle can be detected with high accuracy.

By applying this wheel support bearing assembly to the automotive vehicle, the minute difference in rotation between left and right wheels and change in rotational speed can be detected with a high sensitivity and, therefore, it is possible to perform excellent vehicle control based on these signals so as to increase the safety and maneuverability of the automotive vehicle. By way of example, the accuracy of measurement of the left and right wheel rotating speeds can be improved and the amount of lateral skid of the tire during cornering can be predicated quickly, leading to a more precise performance of a lateral skid prevention system and a vehicle attitude stabilizing system. Accordingly, there is no need to arrange the magnetic sensors 3A and 3B in close proximity to the associated magnetic encoders 2A and 2B to increase the detecting precision, and it is possible to reduce the manufacturing cost of the rotation detection device 1 with the assemblage and processing thereof simplified.

In particular, since in this embodiment the absolute angle calculated by the angle calculator 7 is corrected by the corrector 12 thereof with the use of the output of the magnetic sensor (which is, in this instance, the magnetic sensor 3A) on the side of either one of the magnetic encoders, the absolute angle can be detected with a further accuracy without being affected by noises and the magnetic interference between the magnetic encoders 2A and 2B.

Although in this first embodiment reference has been made to the use of the two magnetic encoders 2A and 2B, the number of the magnetic encoders used may not be limited to two such as shown and described and three or more magnetic encoders having the respective number of the magnetic pairs different from each other may be combined so that the absolute angle can be detected over a wide range.

Since in the rotation detector equipped wheel support bearing assembly has the above described rotation detection device 1 mounted therein, the following specific advantages can be obtained in addition to those hereinbefore described.

Since each of the magnetic sensors 3A and 3B used in the rotation detection device 1 has a function of detecting information on a position within one of the magnetic poles of the associated magnetic encoder 2A and 2B, the rotation of the vehicle wheel can be detected with a finer resolution than the number of the magnetic pole pairs magnetized and the resolution for rotations that is several times to some tens times higher than that of the conventional counterpart can be obtained.

Since the two phase signals before multiplication can be obtained from the magnetic sensors 3A and 3B and the direction of rotation can be determined from those signals, the direction of rotation of the vehicle wheel can also be detected.

When this rotation detector equipped wheel support bearing assembly is applied to the automotive vehicle, in contrast to the conventional counterpart, in which during the start at the steep slope the brake system operates when the automotive vehicle travels, for example, 20 mm at maximum, it is possible to detect the movement of the automotive vehicle when the latter moves, for example, even 1 mm rearwardly so that the automotive vehicle brake system can be immediately operated.

Since the rotation detection device 1 can detect the absolute angle, not only the direction of rotation but also an index signal outputted and corresponding to a predetermined angle can also be obtained if arrangement is made to allow the ABZ phase signals to be outputted based on the absolute angle so detected in the manner described hereinabove.

The absolute angle detecting circuit for calculating the absolute angle such as shown in FIG. 7 may be integrated on a semiconductor chip, thereby allowing the space required for installation to be minimized and making it possible to implement it in a wheel support bearing assembly compactly.

The rotation detection device may be mounted in a wheel support bearing assembly for, for example, an automotive vehicle in combination with a vibration sensor, thus making it possible to identify, for example, the position where a damage has occurred in the vehicle wheels and/or bearing assemblies can be identified with the use of the absolute angle information. In other words, since it is possible to identify the rotational location of the wheel corresponding to the time when the vibrations start to occur during traveling, the damaged locations can be identified from monitored signals, provided that the relation between a predetermined reference position in installation and the Z phase position of the rotation detection device 1 is determined beforehand.

Figure 12:
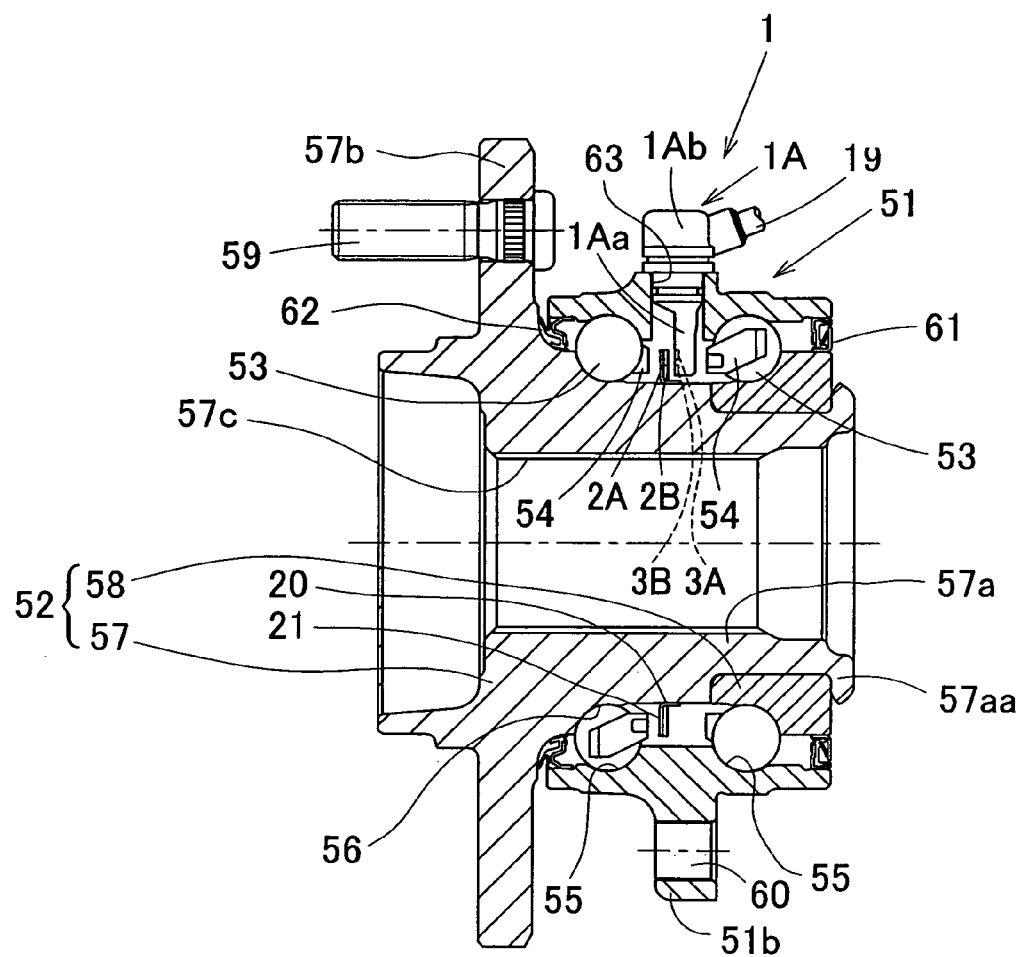
FIG. 12 is a sectional view showing the rotation detection device equipped wheel support bearing assembly according to a second preferred embodiment of the present invention.
Figure 13:
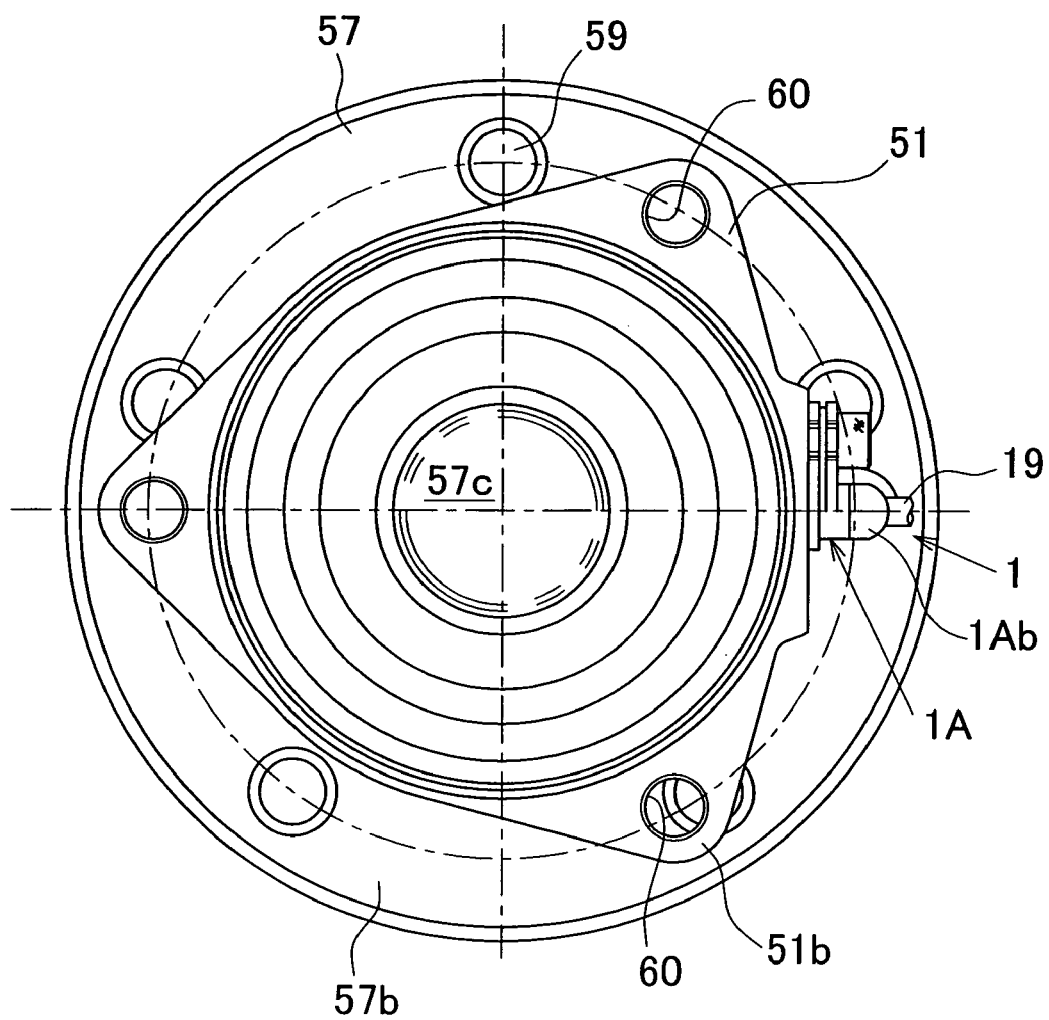
FIG. 13 is a side view showing the wheel support bearing assembly as viewed from the inboard side.

FIGS. 12 and 13 illustrate a second preferred embodiment of the present invention. In the wheel support bearing assembly shown in and described with particular reference to FIG. 9, as the rotation detection device 1, that described in connection with the embodiment shown in FIG. 2, in which the direction, in which the magnetic encoders 2A and 2B and the magnetic sensors 3A and 3B are opposed to each other, respectively, is chosen to be in an axial direction, is mounted. As best shown in FIG. 12, each of the magnetic encoders 2A and 2B is of a type in which a multipolar magnet 21 is provided in an upright plate portion of a core metal 20 of an L-shaped sectional configuration. The sensor side unit 1A of the rotation detection device 1 is so constructed that the magnetic sensors 3A and 3B in the foremost end thereof may be opposed respectively to the multipole magnets 21 of the magnetic encoders 2A and 2B in the axial direction. This sensor side unit 1A is also provided at one circumferential location of the wheel support bearing assembly as best shown in FIG. 13.

Other structural features and advantages brought about thereby are similar to those afforded by the first embodiment hereinbefore descried.

Figure 14:
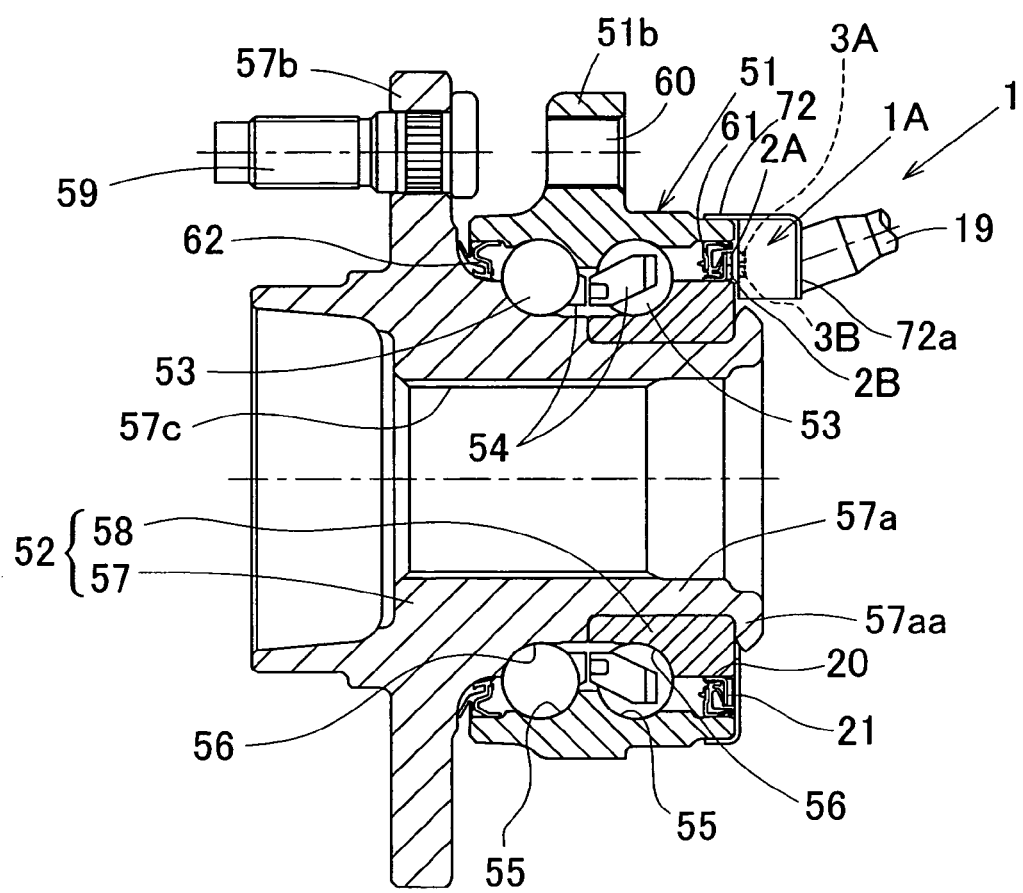
FIG. 14 is a sectional view showing the wheel support bearing assembly according to a third preferred embodiment of the present invention.
Figure 15:
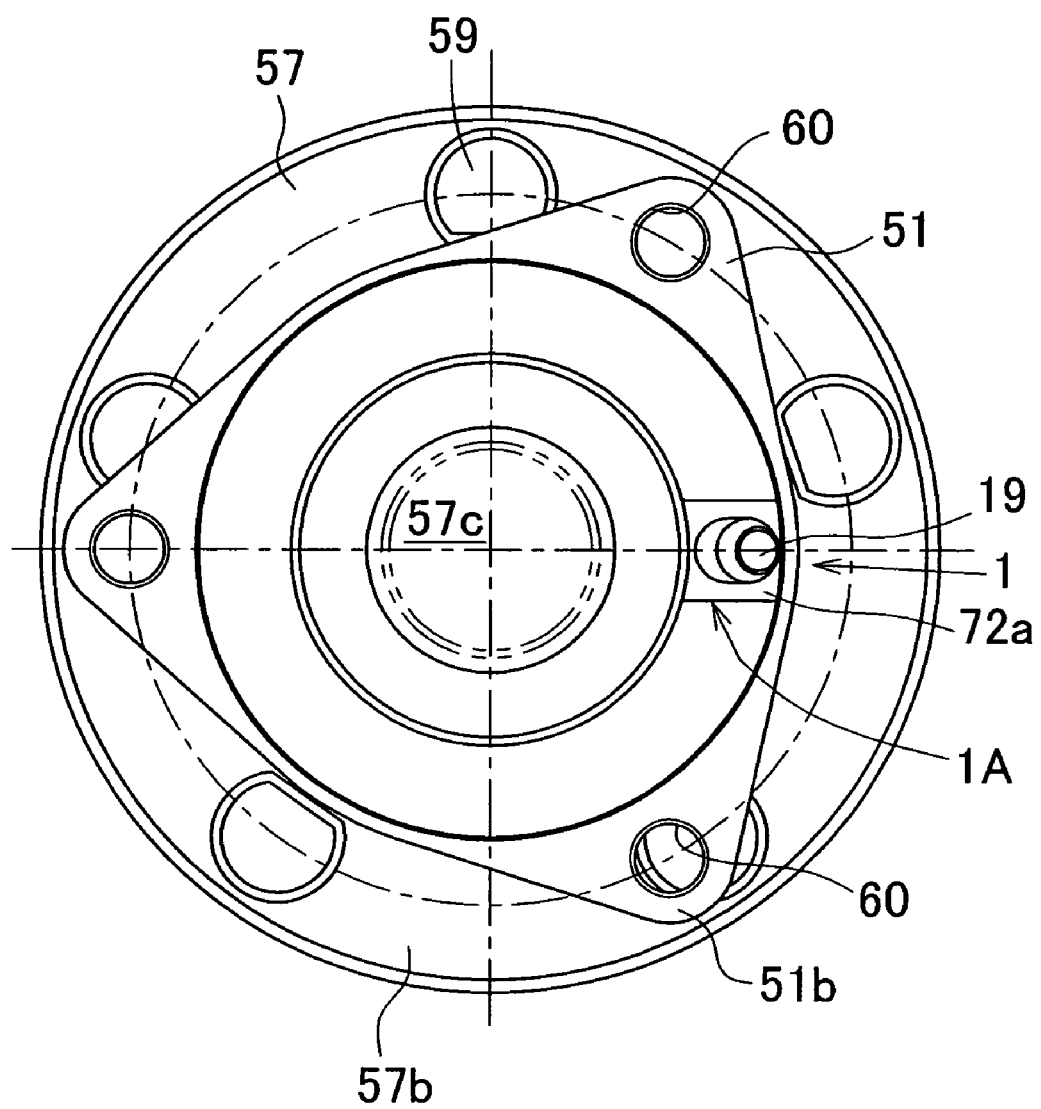
FIG. 15 is a side view showing the wheel support bearing assembly as viewed from the inboard side.

FIGS. 14 and 15 illustrate a third preferred embodiment of the present invention. Even in this embodiment, in the wheel support bearing assembly of the structure shown in and described with reference to FIG. 9, as the rotation detection device 1, that shown and described in connection with the embodiment of FIG. 2, in which the magnetic encoders 2A and 2B are opposed respectively to the magnetic sensors 3A and 3B in the axial direction, is mounted. As best shown in FIG. 14, the sensor side unit 1A of the rotation detection device 1 is fitted to the inboard end of the outer member 51 by means of a sensor mounting member 72. The sensor mounting member 72 is a ring shaped metallic plate mounted on the outer peripheral surface of the outer member 51 in contact with an end face thereof and has a sensor mounting piece 72a provided at a circumferential portion thereof for supporting the sensor side unit 1A fitted thereto. This sensor mounting piece 72 is, as best shown in FIG. 15, of a configuration having a narrow width in the circumferential direction thereof. The magnetic encoders 2A and 2B shown in FIG. 14 are of a type provided with respective multipolar magnets 21 on an upright plate portion of a core metal 20 of an L-shaped sectional configuration and mounted on the outer periphery of the inner ring 58. The magnetic encoders 2A and 2B are rendered to concurrently serve as a part of the inboard sealing element 61.

In the case of this construction, the sensor mounting hole 63 such as employed in the previously described first embodiment is not provided and, therefore there is no problem associated with ingress of water through the sensor mounting hole. Other structural features and advantages brought about thereby are similar to those shown in and described in connection with the first embodiment of FIG. 9.

Figure 16:
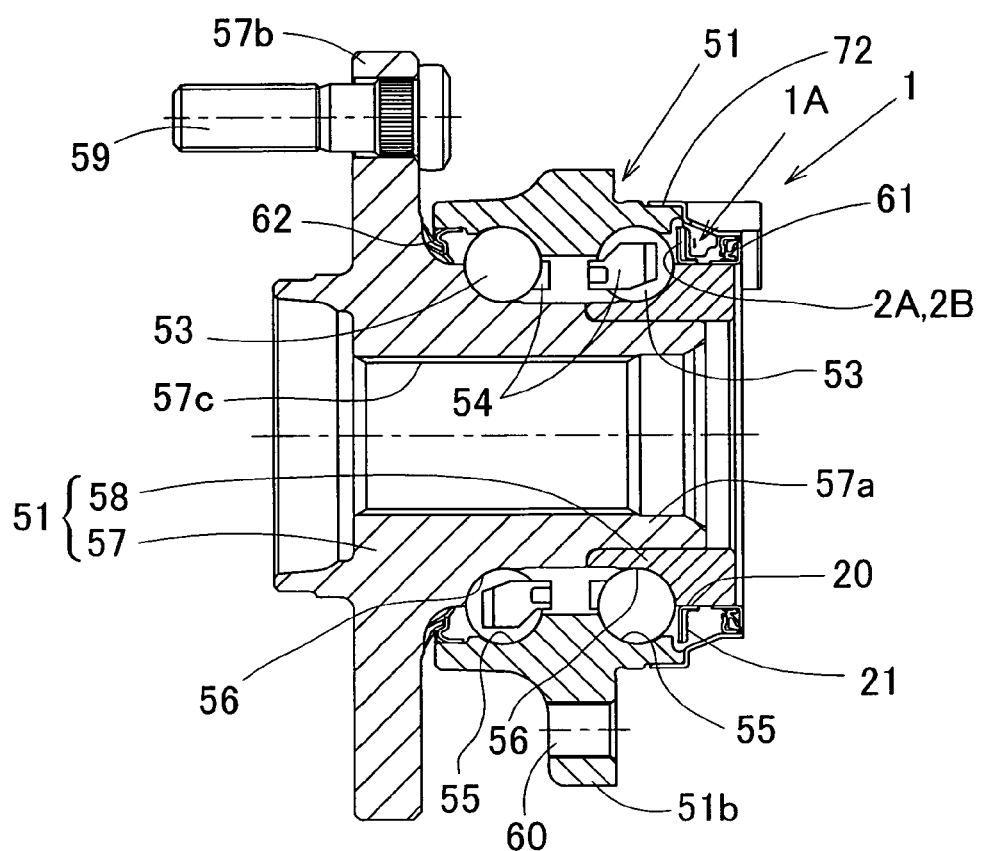
FIG. 16 is a sectional view showing the wheel support bearing assembly according to a fourth preferred embodiment of the present invention.
Figure 17:
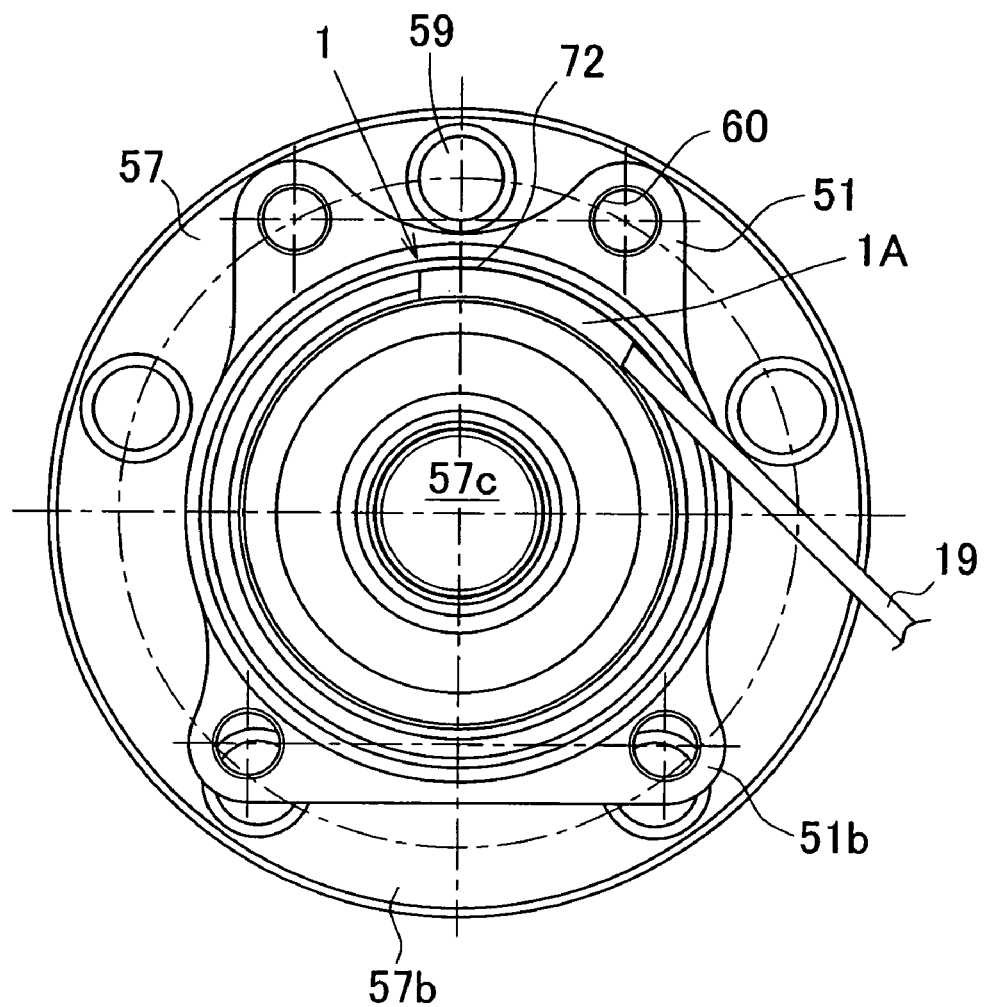
FIG. 17 is a side view showing the wheel support bearing assembly as viewed from the inboard side.

FIGS. 16 and 17 illustrate a fourth preferred embodiment of the present invention. This embodiment is such that in the third embodiment shown in and described with reference to FIGS. 14 and 15, the inboard sealing element 61 for the bearing space is positioned outwardly of the magnetic encoders 2A and 2B. In other words, as best shown in FIG. 16, the sealing element 61 such as, for example, a contact seal element is provided between an annular sensor mounting member 72, fitted to the outer member 51, and the inner ring 58. As best shown in FIG. 17, a cord 19 is drawn outwardly from the sensor side unit 1A in a tangential direction with respect to the bearing assembly.

In the case of this construction, because of the presence of the sealing element 61, the magnetic encoders 2A and 2B are sealed from the outside space and any undesirable ingress of, for example, foreign matter in between the magnetic encoders 2A and 2B and the sensor side unit 1A can be avoided. Other structural features and advantages brought about thereby are similar to those in the previously described third embodiment shown in FIGS. 14 and 15.

Figure 18:
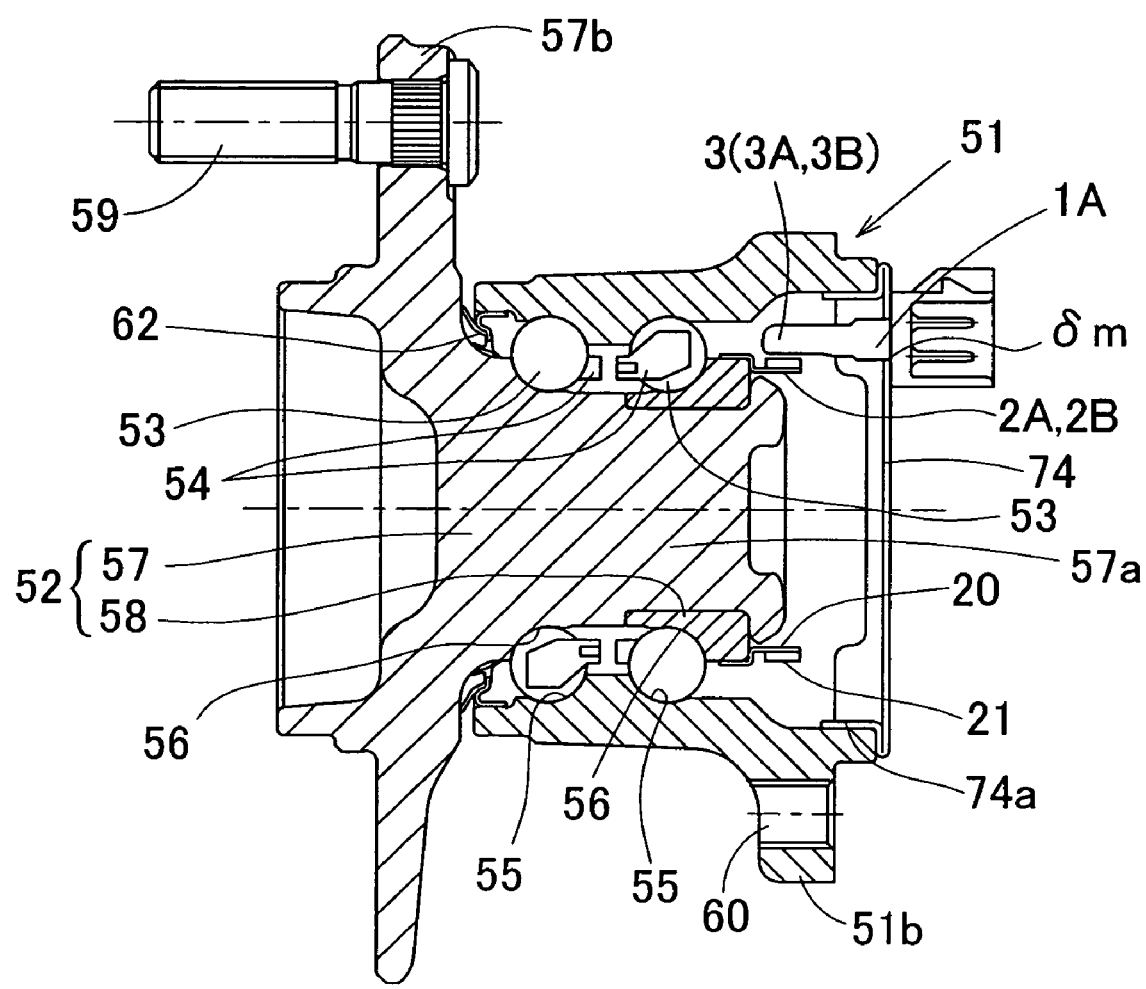
FIG. 18 is a sectional view showing the wheel support bearing assembly according to a fourth preferred embodiment of the present invention.
Figure 19:
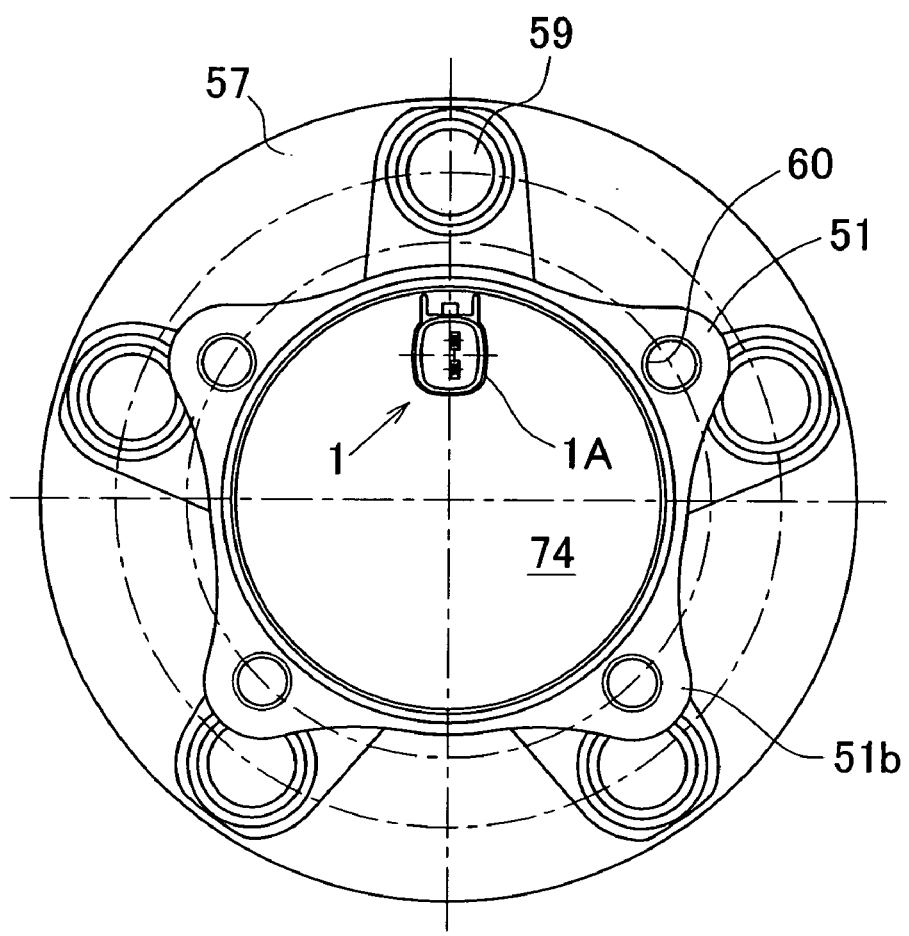
FIG. 19 is a side view showing the wheel support bearing assembly as viewed from the inboard side.

FIGS. 18 and 19 illustrate a sixth preferred embodiment of the present invention. This embodiment is such that in the embodiment shown in and described with particular reference to FIG. 9, the wheel support bearing assembly is rendered for use in supporting a vehicle driven wheel and is so designed that the hub unit 57A has no center bore defined therein and is in the form of a solid body. The inboard end of the outer member 51 extends a distance axially beyond the inner member 52 with its open end covered with a covering 74. The covering 74 is mounted on the outer member 51 while a collar 74a formed in an outer peripheral edge thereof is engaged in an inner periphery of the outer member 51. The sensor side unit 1A is fitted to this covering 74 so as to confront the associated magnetic encoders 2A and 2B. The sensor side unit 1A is removably fitted to the covering 74 by means of, for example, bolts and nuts (both not shown) while at least a sensor portion 3 of the sensor side unit 1A (a portion where the magnetic sensors 3A and 3B are embedded) is inserted therethrough. In the condition in which the sensor portion 3 is inserted through the covering 74, an annular gap δm delimited between the covering 74 and the sensor side unit 1A is tightly sealed by the effect of an elasticity of a molding material (an elastic member) covering the sensor portion 3. As can readily be seen from FIG. 19, the covering 74 is in the form of a disc shaped plate having no opening other than a portion where the sensor side unit 1A is fitted. The magnetic encoders 2A and 2B shown in FIG. 18 are fitted having been mounted on the outer periphery of the inner ring 58 and are opposed to the sensor side unit 1A in the radial direction.

In the case of this construction, although the application is limited to the vehicle driven wheel, the opening at the end of the outer member 51 is in its entirety covered by the covering 74, thereby providing a high sealing performance with a simplified construction. Other structural features and advantages brought about thereby are similar to those afforded by the first embodiment shown in and described with particular reference to FIG. 9.

Figure 20:
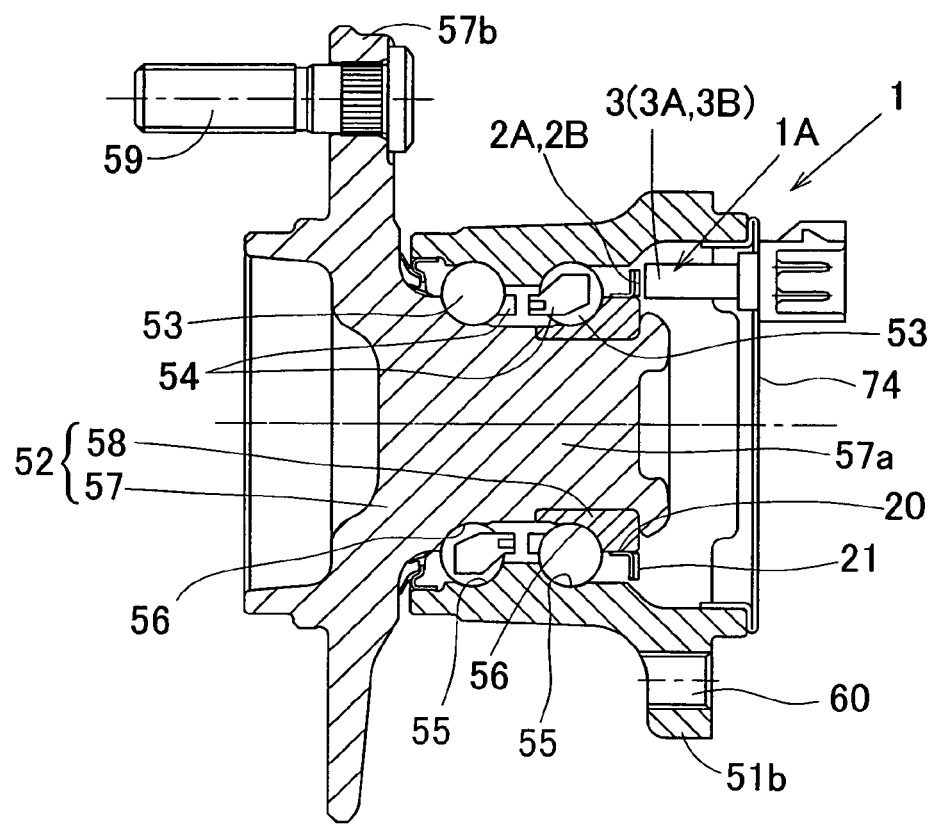
FIG. 20 is a sectional view showing the wheel support bearing assembly according to a sixth preferred embodiment of the present invention.
Figure 21:
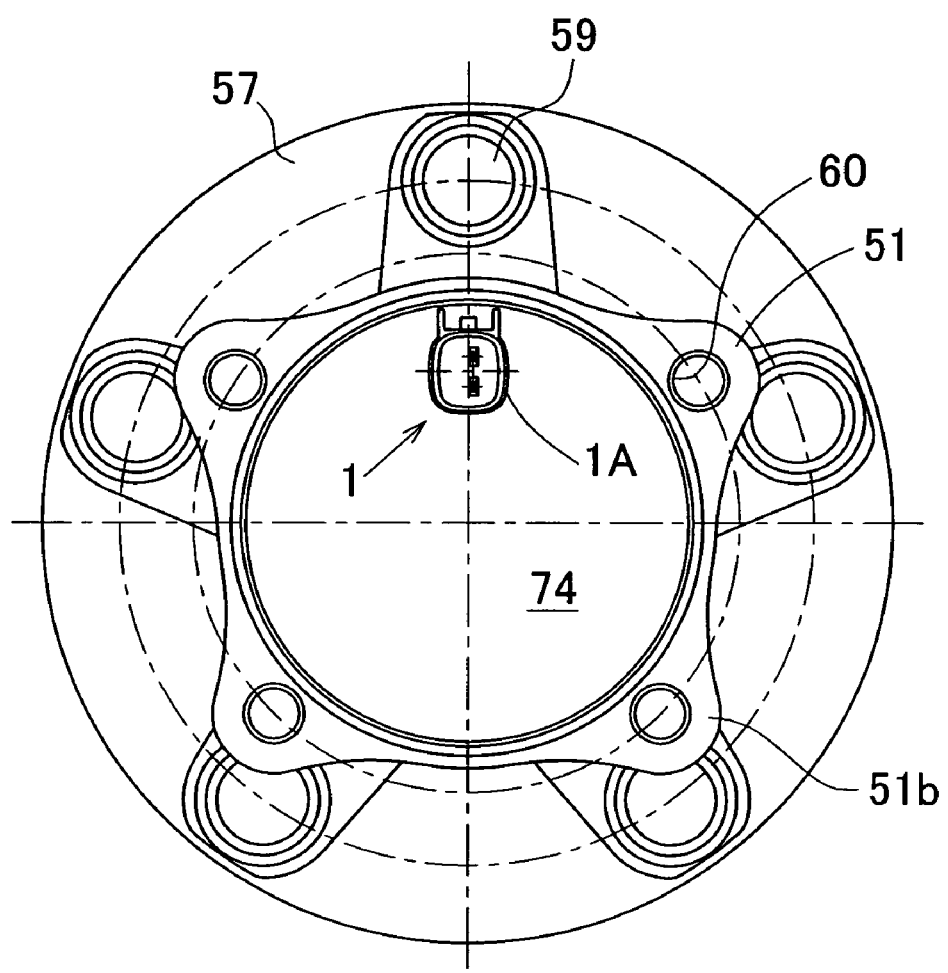
FIG. 21 is a side view showing the wheel support bearing assembly as viewed from the inboard side.

FIGS. 20 and 21 illustrate a sixth preferred embodiment of the present invention. This embodiment is such that in the example shown in and described with particular reference to FIGS. 18 and 19, the magnetic encoders 2A and 2B and the sensor side unit 1A are opposed to each other in the axial direction. Other structural features and advantages brought about thereby are similar to those afforded by the fifth embodiment shown in and described with particular reference to FIGS. 18 and 19.

Figure 22:
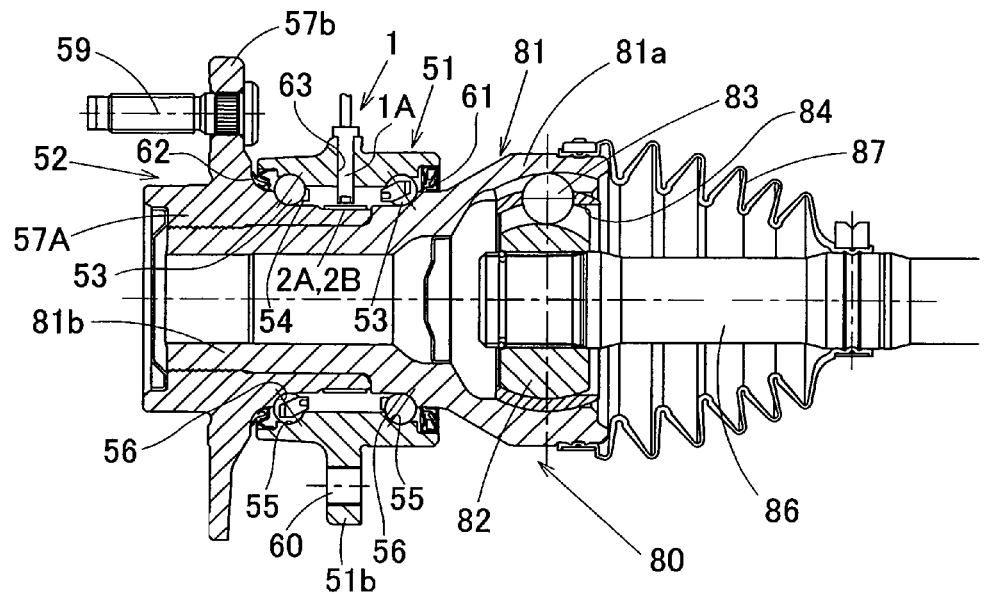
FIG. 22 is a sectional view showing the wheel support bearing assembly according to a seventh preferred embodiment of the present invention.

The wheel support bearing assembly shown in FIG. 22 showing a seventh preferred embodiment of the present invention is an example of a so-called fourth generation type, in which the inner member 52 is made of a hub unit 57A and a constant velocity universal joint outer ring 81.

The constant velocity universal joint 80 is of a structure in which a plurality of axially oriented raceway grooves are formed in a spherical outer surface of the inner ring 82 and a similarly spherical inner surface of the outer ring 81 thereof, with torque transmitting balls 83 interposed between the opposed raceway grooves. The torque transmitting balls 83 are retained by and in a retainer 84. The inner ring 82 is mounted on a shaft 86. The constant velocity universal joint outer ring 81 has a stem portion 81b in the form of a hollow shaft protruding outwardly from an outer bottom surface of a cup portion 81a. This stem portion 81b is inserted inside the hub unit 57A of the wheel support bearing assembly and is unitarily coupled together with the hub unit 57A by means of a diametric expanding and crimping technique. The rolling surfaces 56 of the inner member 52 are formed in the hub unit 57A and the constant velocity universal joint outer ring 81, respectively. A boot 87 in the form of bellows is mounted between an opening of the cup portion 81a of the constant velocity universal joint outer ring 81 and an outer periphery of the shaft 86.

The sensor side unit 1A of the rotation detection device 1 is fitted to the outer member 51 by inserting it into a sensor mounting hole 63 defined in the outer member 51 so as to extend radially as is the case with that in the first embodiment of the present invention shown in and described with particular reference to FIG. 9. The magnetic encoders 2A and 2B are, as is the case with the embodiment shown in and described with reference to FIG. 9, fitted having been mounted on the outer periphery of the hub unit 57A in the inner member 52. The magnetic encoders 2A and 2B and the sensor side unit 1A are opposed to each other in the radial direction.

Even in this seventh embodiment described above, functions and advantages similar to those afforded by the first embodiment shown in and described with reference to FIG. 9 can be obtained as far as the rotation detection device 1 is concerned.

Figure 23:
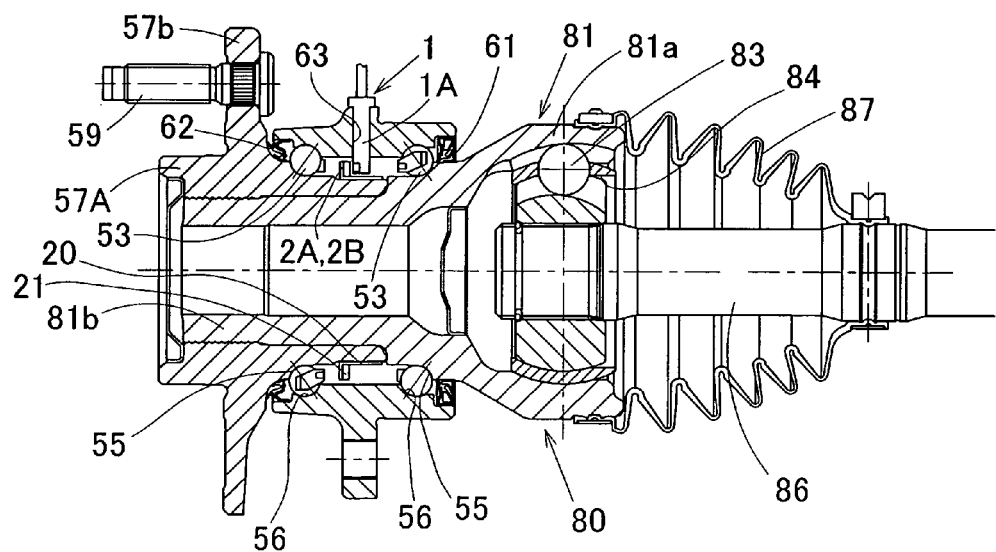
FIG. 23 is a sectional view showing the wheel support bearing assembly according to an eighth preferred embodiment of the present invention.

An eighth preferred embodiment of the present invention shown in FIG. 23 is such that in the previously described seventh embodiment shown in FIG. 22, the magnetic encoders 2A and 2B are opposed to the sensor side unit 1A in the axial direction. Other structural features and advantages brought about thereby are similar to those afforded by the seventh embodiment shown in and described with particular reference to FIG. 22.

Figure 24:
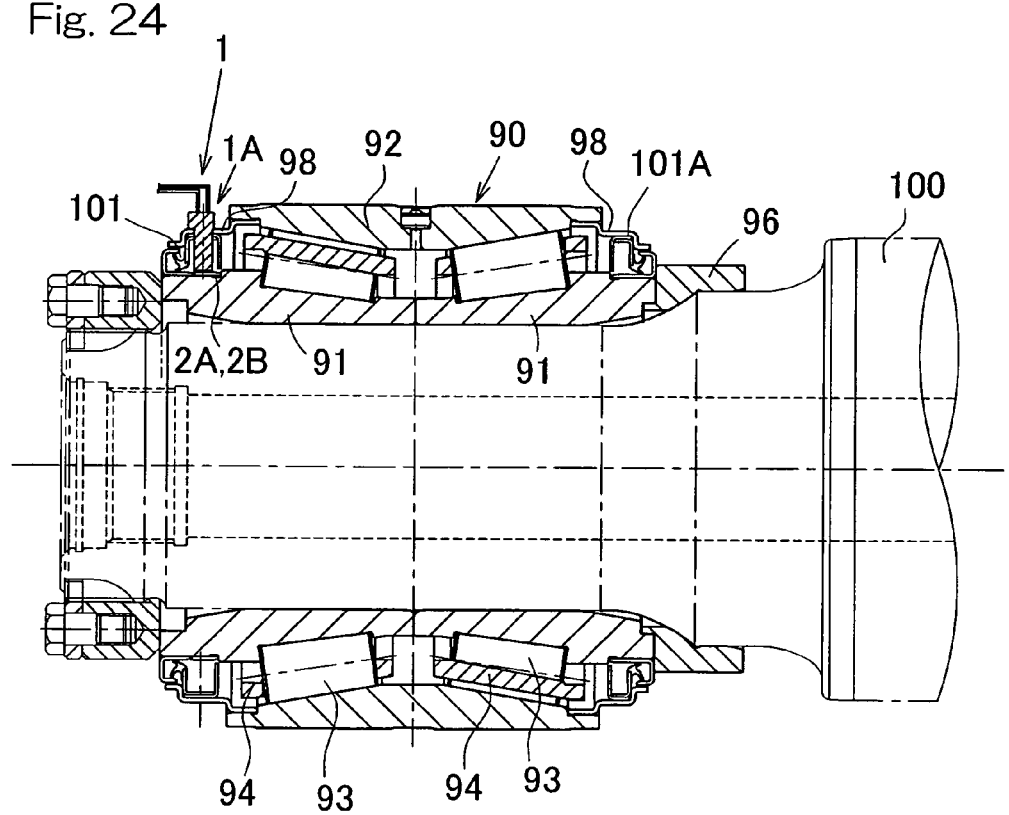
FIG. 24 is a sectional view showing the wheel support bearing assembly according to a ninth preferred embodiment of the present invention.
Figure 25:
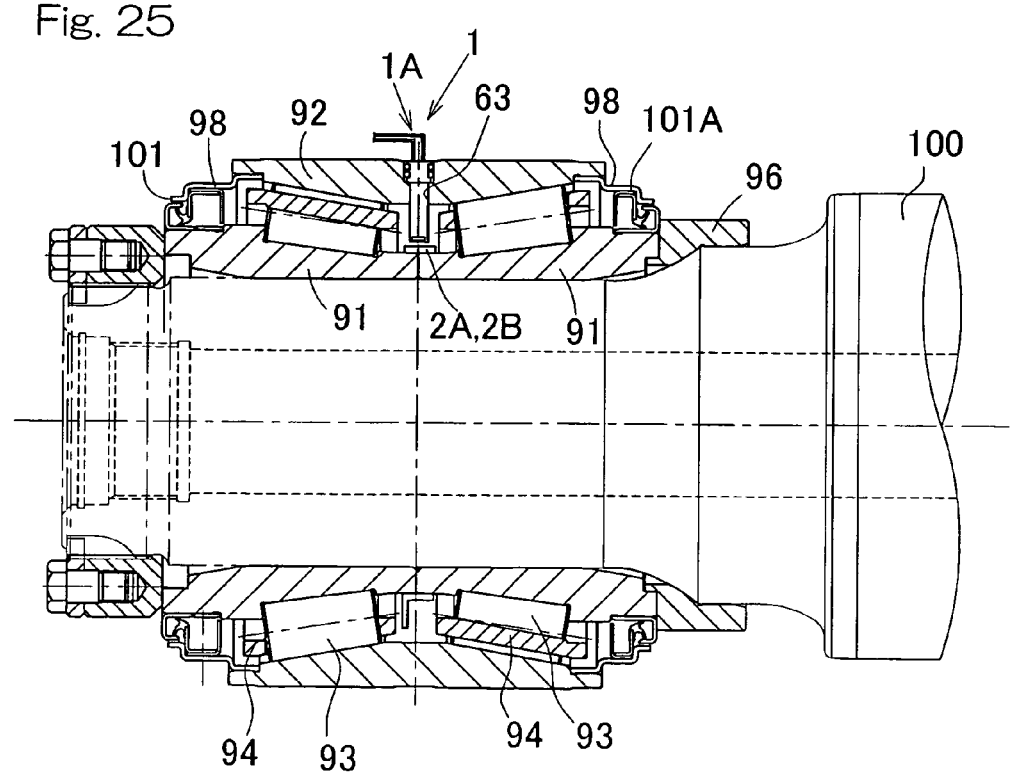
FIG. 25 is a sectional view showing the wheel support bearing assembly according to a tenth preferred embodiment of the present invention.

Each of FIGS. 24 and 25, showing ninth and tenth preferred embodiments of the present invention, respectively, illustrates an embodiment in which the rotation detection device 1 according to any one of the previously described preferred embodiments of the present invention is incorporated in the rotation detector equipped wheel support bearing assembly used in a railway vehicle bearing system. This bearing assembly 90 is in the form of a roller bearing, more specifically a double row tapered roller bearing and includes separate type inner rings 91 and 91 provided relative to respective rows of rollers 93 and 93, an outer ring 92 of one piece construction, the rollers 93 and 93 referred to above, and retainers 94. A rear lid 96 is fitted to the outer ring 92 at an intermediate location of the axle 100 and rearwardly of the bearing assembly 90. Bearing seal elements 101 and 101A arranged on respective opposite ends of the bearing assembly 90 serve to seal a lubricant oil within an interior of the bearing assembly 90 and also to secure anti-dust and water proofing properties.

In the ninth embodiment shown in FIG. 24, of the bearing seal element 101 on the outboard side, an annular seal casing 98 fitted to the end of the bearing outer ring 92 accommodates the sensor side unit 1A therein. In this case, the magnetic encoders 2A and 2B are fitted having been mounted on the outer periphery of the inner ring 91 on the outboard side so as to confront the sensor side unit 1A in the radial direction. It is to be noted that although not shown, the sensor side unit 1A may be mounted in the annular seal casing 98 on the inboard side of the bearing outer ring 92.

In the tenth embodiment shown in FIG. 25, the sensor side unit 1A is fitted having been inserted into a sensor mounting hole 63 defined in the bearing outer ring 92 so as to extend radially at a location intermediate between the respective rows of the rollers 93 and 93. Even in the rotation detector equipped wheel support bearing assembly having the rotation detection device 1 incorporated in the railway vehicle bearing system, an accurate detection of the rotational position can be accomplished with a high resolution. Even in the railway vehicle bearing system, it is possible to install a vibration sensor in the bearing assembly or a journal box to monitor the status of vibration during the travel of the railway vehicle so that damages occurring in the wheel and/or the bearing assembly can be detected.

Figure 26:
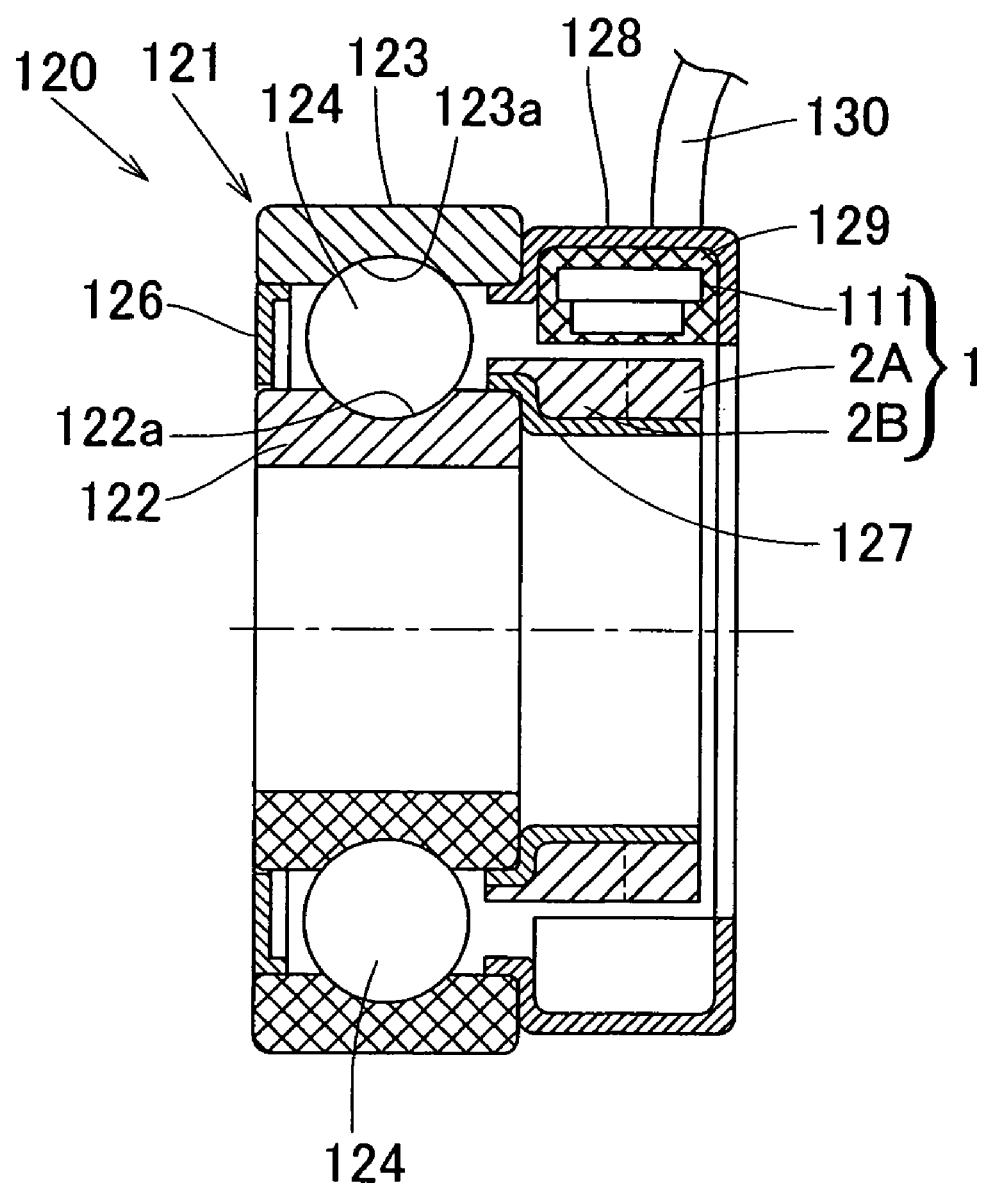
FIG. 26 is a sectional view showing the rolling bearing assembly according to an eleventh preferred embodiment of the present invention.

FIG. 26 illustrates an eleventh preferred embodiment of the present invention. This embodiment is directed to a rotation detector equipped wheel support bearing assembly having the previously described rotation detection device 1 incorporated therein and this rotation detector equipped wheel support bearing assembly 120 is provided with the rotation detection device 1 mounted on one end of a rolling bearing unit 121 having a plurality of rolling elements 124 interposed between an inner ring 122, which is a rotating ring, and an outer ring 123 which is a stationary ring. The rolling bearing unit 121 is in the form of a deep groove ball bearing and rolling surfaces 122a and 123a for the rolling elements 124 are defined, respectively, in an outer diametric surface of the inner ring 122 and an inner diametric surface of the outer ring 123. A bearing space delimited between the inner ring 122 and the outer ring 123 has ends opposite to each other, and one of the ends of the bearing space remote from the end where the rotation detection device 1 is installed, is sealed by a sealing element 126.

The two magnetic encoders 2A and 2B of the rotation detection device 1 are juxtaposed relative to each other in the axial direction on an outer diametric surface of a ring shaped core metal 127 that is mounted under press fit in an outer diametric surface of one end of the inner ring 122. The two magnetic sensors 3A and 3B of the rotation detection device 1 are integrated into a sensor module 111 together with the signal processing circuit shown in and described with particular reference to FIG. 2 and are covered by a resin molding 129 while the module 111 is inserted inside a ring shaped metallic sensor housing 128, which is in turn fitted to an inner diametric surface of one end of the outer ring 123. In this way, the magnetic encoders 2A and 2B and the associated magnetic sensors 3A and 3B are arranged and opposed to each other in the radial direction. A lead line 130 connected to the sensor module 111 is drawn outwardly through the sensor housing 128 and, through this lead line, transmission of signals and an electric power supply take place between the sensor module 111 and an external circuit.

Since in this rotation detector equipped bearing assembly the rotation detection device 1 is mounted on the rolling bearing assembly 121, reduction in number of component parts used in a bearing utilizing machine or equipment, reduction in number of assembling steps and compactization can be achieved while it is equipped with a function of detecting the absolute angle.

Although in describing the wheel support bearing assemblies according to the various preferred embodiments of the present invention, reference has been made to the third generation type and the fourth generation type, the rotation detector equipped wheel support bearing assembly of the present invention can be equally applied to a wheel support bearing assembly of a first generation type or a second generation type, in which the hub unit and the bearing are provided separately and also to a wheel support bearing assembly of a type, in which the outer member is rotating and the inner member is stationary. Also, the present invention can be applied not only to the angular contact ball bearing type, but also to any of various types of wheel support bearing assemblies.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A rotation detecting device comprising:
a plurality of magnetic encoders of a ring shape arranged coaxially and having different numbers of magnetic poles;
a plurality of magnetic sensors each operable to detect the magnetic field of the corresponding magnetic encoder and having a function of detecting positional information within a single magnetic pole of the corresponding magnetic encoder;
a phase difference detector to determine the phase difference of magnetic field signals detected respectively by the magnetic sensors; and
an angle calculator to calculate an absolute rotation angle of the magnetic encoders based on the detected phase difference,
wherein each of the magnetic sensors includes a plurality of sensor elements arranged in offset relation relative to each other within a pitch between the neighboring magnetic poles so as to provide two phase signal outputs forming sine and cosine curves, respectively, and operable to detect the position within the single magnetic pole by frequency multiplication.

2. A rotation detecting device comprising:
a plurality of magnetic encoders of a ring shape arranged coaxially and having different numbers of magnetic poles;
a plurality of magnetic sensors each operable to detect the magnetic field of the corresponding magnetic encoder and having a function of detecting positional information within a single magnetic pole of the corresponding magnetic encoder;
a phase difference detector to determine the phase difference of magnetic field signals detected respectively by the magnetic sensors; and
an angle calculator to calculate an absolute rotation angle of the magnetic encoders based on the detected phase difference,
wherein each of the magnetic sensors comprises a line sensor, in which sensor elements are lined up in a direction conforming to the direction in which the magnetic poles of the corresponding magnetic encoder are arranged and is operable to detect the position within the single magnetic pole by generating two phase signal outputs forming sine and cosine curves by unit of calculation.

3. The rotation detection device as claimed in claim 1, further comprising an angle information output circuit to output the absolute angle calculated by the angle calculator,
wherein the magnetic sensors, the phase difference detector, the angle calculator and the angle information output circuit are integrated together into a sensor module.

4. The rotation detection device as claimed in claim 3, wherein the sensor module is integrated on a semiconductor chip.

5. The rotation detection device as claimed in claim 1, wherein the angle calculator includes a corrector to correct the calculated absolute angle with an output from one of the magnetic sensors, which is adjacent either one of the magnetic encoders.

6. A rotation detecting device comprising:
a plurality of magnetic encoders of a ring shape arranged coaxially and having different numbers of magnetic poles;
a plurality of magnetic sensors each operable to detect the magnetic field of the corresponding magnetic encoder and having a function of detecting positional information within a single magnetic pole of the corresponding magnetic encoder;
a phase difference detector to determine the phase difference of magnetic field signals detected respectively by the magnetic sensors;
an angle calculator to calculate an absolute rotation angle of the magnetic encoders based on the detected phase difference; and
an angle information output circuit to output the absolute angle, calculated by the angle calculator, in the form of an ABZ phase signal comprised of two, A phase and B phase pulse signals which are displaced 90° in phase relative to each other and a Z phase pulse signal indicative of a position of origin.

7. The rotation detection device as claimed in claim 6, wherein the angle calculator includes a corrector to correct the calculated absolute angle with an output from one of the magnetic sensors, which is adjacent either one of the magnetic encoders, and the angle information output circuit is operable to output an ABZ phase signal with reference to the output of one of the magnetic sensors, which has been selected for use in correction of the absolute angle.

8. The rotation detection device as claimed in claim 7, wherein the magnetic sensor selected for use in correction of the absolute angle corresponds to one of the magnetic encoders having the different numbers of magnetic poles, which has the number of the magnetic poles greater than the others of the magnetic encoders.

9. A wheel support bearing assembly equipped with a rotation detection device, in which the rotation detection device as described in claim 1 is mounted on a bearing thereof.

10. The rotation detection device as claimed in claim 2, further comprising an angle information output circuit to output the absolute angle calculated by the angle calculator,
wherein the magnetic sensors, the phase difference detector, the angle calculator and the angle information output circuit are integrated together into a sensor module.

11. The rotation detection device as claimed in claim 10, wherein the sensor module is integrated on a semiconductor chip.

12. The rotation detection device as claimed in claim 2, wherein the angle calculator includes a corrector to correct the calculated absolute angle with an output from one of the magnetic sensors, which is adjacent either one of the magnetic encoders.

* * * * *